(12) United States Patent
Yamamoto

(10) Patent No.: US 10,022,810 B2
(45) Date of Patent: Jul. 17, 2018

(54) CUTTING TOOL AND METHOD FOR MANUFACTURING MACHINED PRODUCT

(71) Applicant: KYOCERA Corporation, Kyoto-shi, Kyoto (JP)

(72) Inventor: Masahiro Yamamoto, Moriyama (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 15/305,202

(22) PCT Filed: Apr. 24, 2015

(86) PCT No.: PCT/JP2015/062471
§ 371 (c)(1),
(2) Date: Oct. 19, 2016

(87) PCT Pub. No.: WO2015/163436
PCT Pub. Date: Oct. 29, 2015

(65) Prior Publication Data
US 2017/0036279 A1 Feb. 9, 2017

(30) Foreign Application Priority Data
Apr. 24, 2014 (JP) ................................. 2014-090423

(51) Int. Cl.
*B23C 5/06* (2006.01)
*B23C 5/22* (2006.01)
(52) U.S. Cl.
CPC .............. *B23C 5/2247* (2013.01); *B23C 5/06* (2013.01); *B23C 5/2221* (2013.01);
(Continued)
(58) Field of Classification Search
CPC ................ B23C 5/2247; B23C 5/2221; B23C 2210/168; B23C 5/06; B23C 2200/121; B23C 2200/128
See application file for complete search history.

(56) References Cited

U.S. PATENT DOCUMENTS

| 6,270,292 B1 | 8/2001 | Satran et al. |
| 7,326,006 B2 * | 2/2008 | Hecht ................. B23B 27/04 407/115 |
| 2012/0195700 A1 | 8/2012 | Chen et al. |

FOREIGN PATENT DOCUMENTS

| JP | 2002-519203 A | 7/2002 |
| JP | 2006-281433 A | 10/2006 |

(Continued)

OTHER PUBLICATIONS

Interational Search Report (Form PCT/ISA/210) dated Jul. 28, 2015, issued for PCT/JP2015/062471.
(Continued)

*Primary Examiner* — Alan Snyder
(74) *Attorney, Agent, or Firm* — Volpe and Koenig, P.C.

(57) ABSTRACT

A cutting tool of an aspect is provided with a holder and a cutting insert attached to an insert pocket of the holder. The cutting insert includes a front end surface, a rear end surface, a front side surface, a rear side surface, an outer side surface, and an inner side surface. The cutting edge is disposed along a ridge line at an intersection between the front side surface and the front end surface, and a ridge line at an intersection between the front side surface and the outer side surface. The insert pocket includes a restraining surface that is in contact with the rear side surface, in a front end view, the restraining surface includes a projecting portion having a curved line shape projecting toward the front in the rotational direction, and the rear side surface includes a recessed portion that is in contact with the projecting portion.

9 Claims, 23 Drawing Sheets

(52) U.S. Cl.
CPC .......................... *B23C 2200/0444* (2013.01); *B23C 2200/367* (2013.01); *B23C 2210/168* (2013.01)

(56) References Cited

FOREIGN PATENT DOCUMENTS

| | | | |
|---|---|---|---|
| JP | 2007-519532 A | 7/2007 | |
| JP | WO 2010100953 A1 * | 9/2010 | ............. B23C 5/109 |
| WO | 2005/072898 A1 | 8/2005 | |

OTHER PUBLICATIONS

Written Opinion (Form PCT/ISA/237) dated Jul. 28, 2015, issued for PCT/JP2015/062471.

* cited by examiner

CUTTING TOOL AND METHOD FOR MANUFACTURING MACHINED PRODUCT

TECHNICAL FIELD

The present embodiment relates to a cutting tool and to a method for manufacturing a machined product.

BACKGROUND ART

Cutting tools such as the cutting tool described in Japanese Unexamined Patent Application Publication No. 2007-519532A (Patent Document 1) have been known as cutting tools used for machining work materials such as metals. The cutting tool described in Patent Document 1 is provided with a cutting insert and a base (holder) to which the cutting insert is attached. The positioning of the cutting insert with respect to the holder is likely to become unstable when a surface where the cutting insert comes in contact with the holder is a flat surface. For example, when fixing a cutting insert to a holder by a screw, it is necessary to provide a 'looseness' in the screw hole in order to insert the screw in a stable manner. Therefore, the positioning of the cutting insert becomes unstable by an amount relative to the amount of this looseness.

In view of this, the surface where the cutting insert comes in contact with the holder in Patent Document 1 has a wave-type shape and includes a plurality of projecting portions that are mutually separated by a plurality of grooves. The accuracy of positioning of the cutting insert with respect to the holder is increased because this type of wave-type contact surface is provided.

However, when the surface where the cutting insert comes into contact with the holder is the wave-type surface described in Patent Document 1, because of the problems involved in manufacturing accuracy, the wave-type contact surface of the cutting insert may not mate closely with the wave-type contact surface of the holder. Therefore, depending on the manufacturing accuracy, the cutting insert may contact with the holder only at two points, and this makes it difficult to fix the cutting insert to the holder in a stable manner.

In addition, in order to fix the cutting insert to the holder in a stable manner, sometimes a side surface adjacent to the above-mentioned contact surface of a cutting insert is made to be in contact with the holder. In this case, because of the wave-type contacting surfaces of the cutting insert and the holder not mating with each other, the cutting insert gets shifted from the desired position, and it may become difficult to make the side surface be in contact with the holder.

The present embodiment is made in view of the above-mentioned problems, and provides a cutting tool that can fix a cutting insert to a holder in a stable manner.

SUMMARY OF THE INVENTION

A cutting tool according to an aspect is a cutting tool provided with a holder extended in a direction from a front end to a rear end along a rotational axis and including an insert pocket at the front end, and a cutting insert attached to the insert pocket. The cutting insert includes, a front end surface located on a front end side of the holder, a rear end surface opposite to the front end surface, a front side surface located toward the front in a rotational direction of the rotational axis, a rear side surface opposite to the front side surface, an outer side surface located on an outer peripheral side of the holder, and an inner side surface opposite to the outer side surface, and a cutting edge disposed along a ridge line at an intersection between the front side surface and the front side surface and a ridge line at an intersection between the front side surface and the outer side surface. The insert pocket includes a restraining surface that is in contact with the rear side surface. Further, in a front end view, the restraining surface includes a projecting portion having a curved line shape and projecting toward the front in the rotational direction, and the rear side surface includes a recessed portion that is in contact with the projecting portion.

A cutting tool according to another aspect is a cutting tool provided with a holder extended in a direction from a front end to a rear end along a rotational axis and including an insert pocket at the front end, and a cutting insert attached to the insert pocket. The cutting insert includes, a front end surface located on a front end side of the holder, a rear end surface opposite to the front end surface, a front side surface located toward the front in a rotational direction of the rotational axis, a rear side surface opposite to the front side surface, an outer side surface located on an outer peripheral side of the holder, and an inner side surface opposite to the outer side surface, and a cutting edge disposed along a ridge line at an intersection between the front side surface and the front end surface and a ridge line at an intersection between the front side surface and the outer side surface. The insert pocket includes a restraining surface that is in contact with the rear side surface. Further, in a front end view, the rear side surface includes a projecting portion having a curved line shape and projecting toward the rear in the rotational direction, and, the restraining surface includes a recessed portion that is in contact with the projecting portion.

DESCRIPTION OF EMBODIMENTS

A cutting tool 1 according to the first embodiment, as illustrated in FIGS. 1 to 9, is provided with a holder 3 and a cutting insert 5 (may also be referred to simply as an insert 5 in the following). The holder 3 is a substantially cylindrical shaped member extended in a direction from a front end to a rear end along the rotational axis X. The rotational axis X coincides with the central axis of the cylindrical shaped holder 3. During the use of the cutting tool 1, the holder 3 rotates with this rotational axis X as the center.

For the holder 3, steel, cast iron, aluminum alloy, or the like may be used. Of these materials, steel of high rigidity may be used in the cutting tool 1 of the present embodiment. The size of the holder 3 is selected suitably depending on the size of the work material. For example, the length along the rotational axis X may be set to about from 30 to 90 mm. Further, the width in a direction orthogonal to the rotational axis X may be set to about from 20 to 500 mm.

Figure 1:
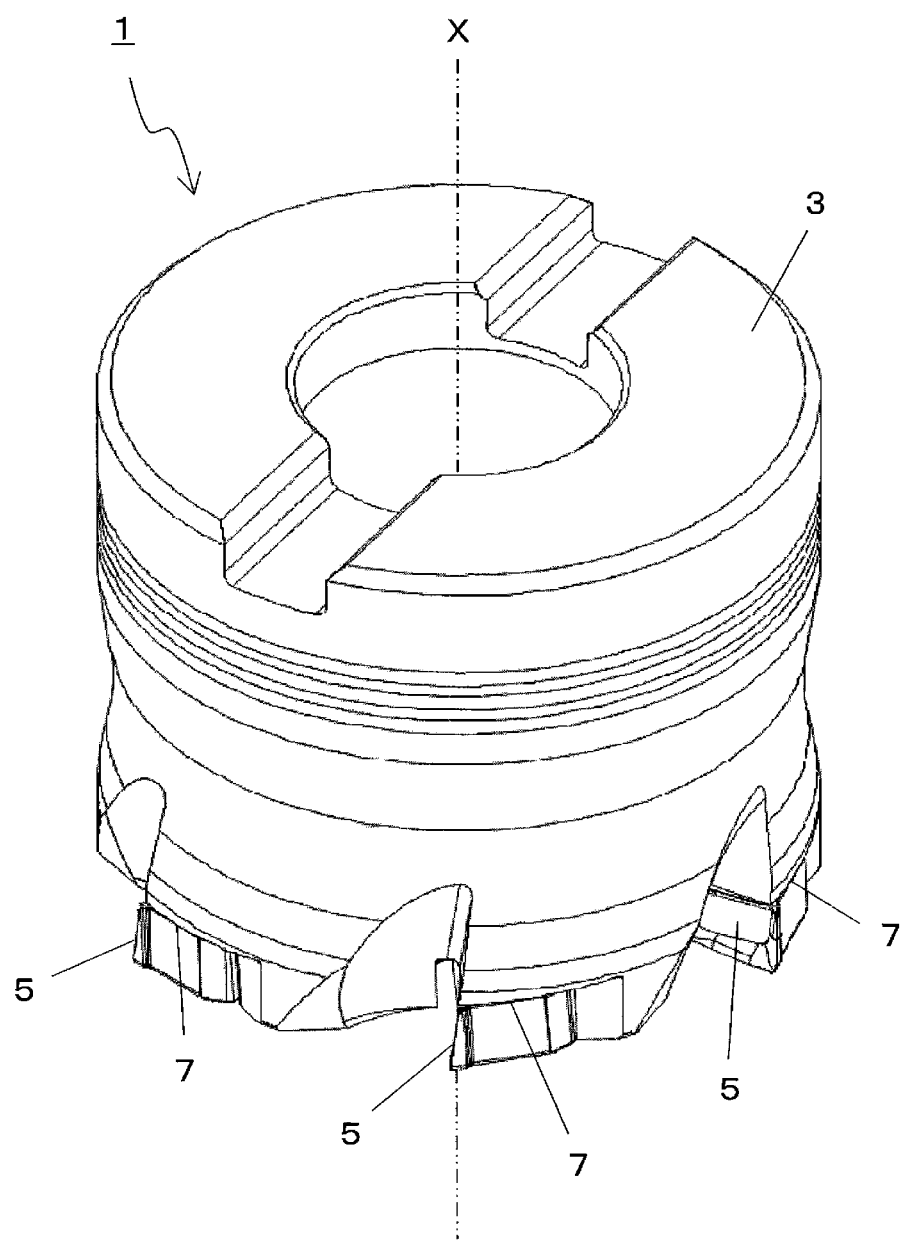
FIG. 1 is a perspective view of a cutting tool of a first embodiment of the present invention.
Figure 2:
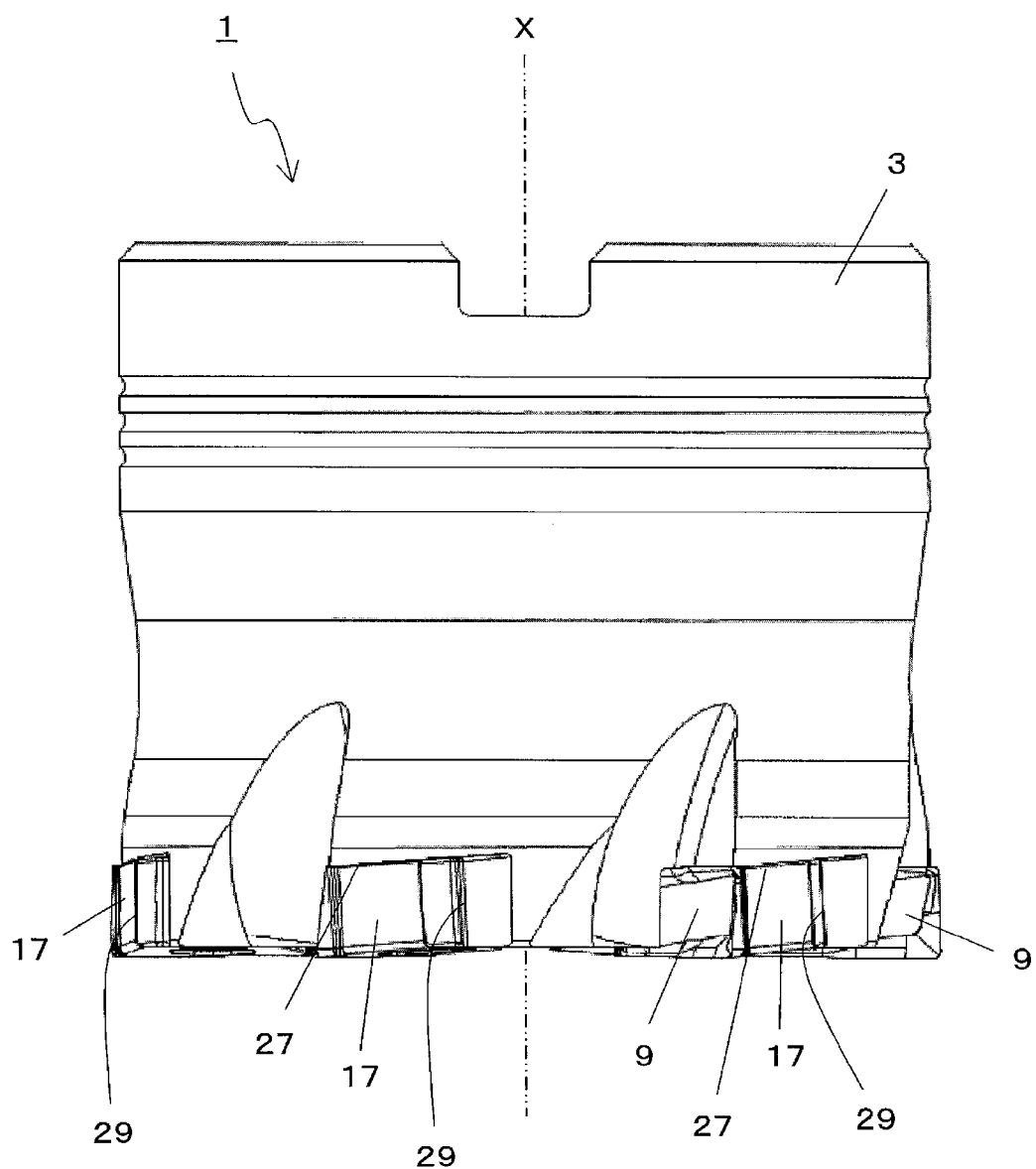
FIG. 2 is a side view of the cutting tool illustrated in FIG. 1.
Figure 3:
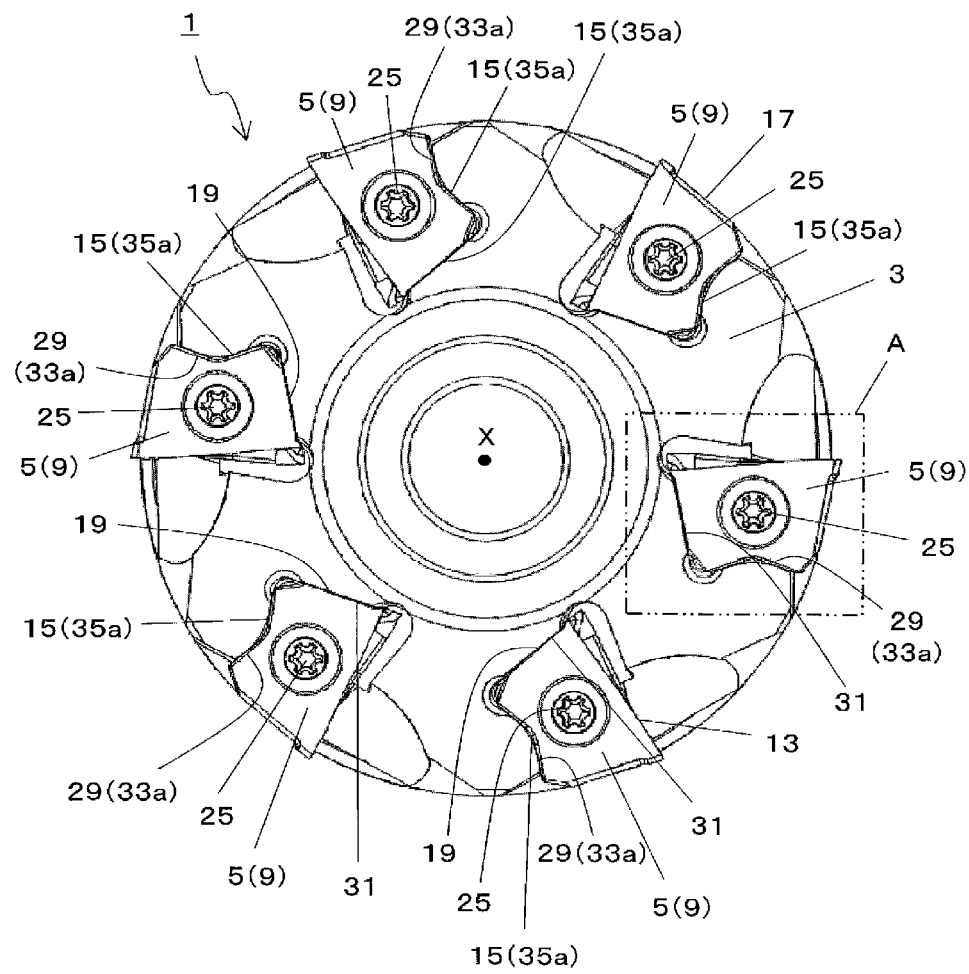
FIG. 3 is a plane view of the cutting tool illustrated in FIG. 1 as viewed from the front end thereof.
Figure 4:
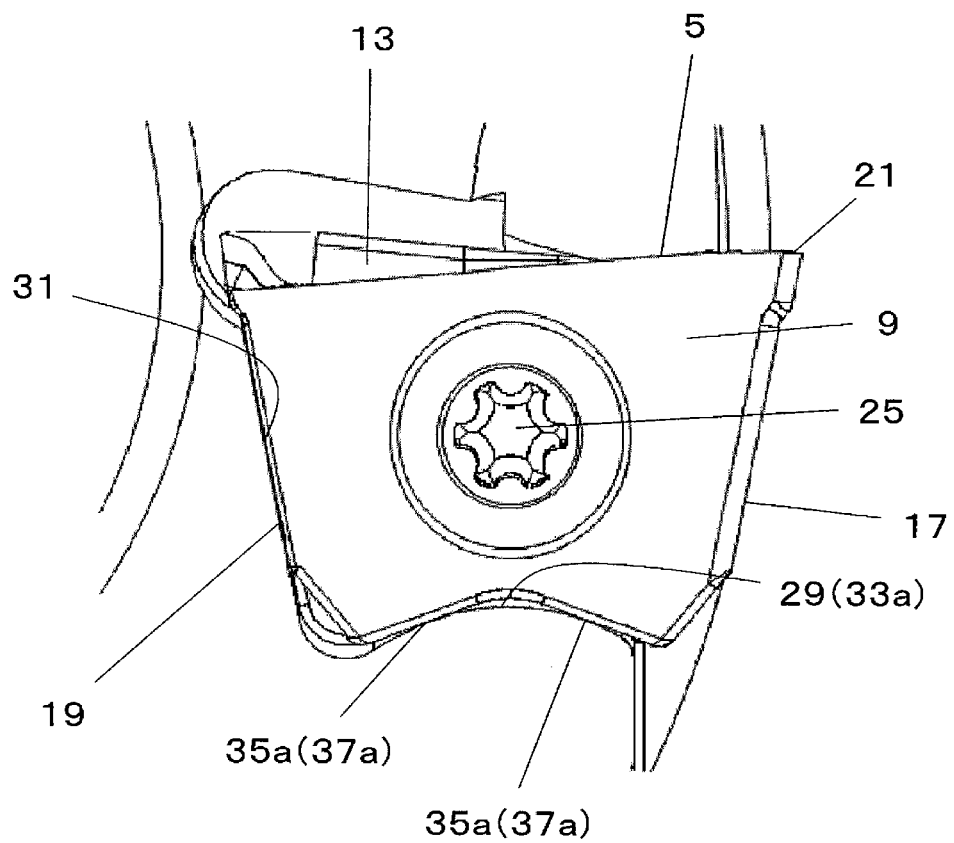
FIG. 4 is an enlarged plane view of the region A of the cutting tool illustrated in FIG. 3.
Figure 5:
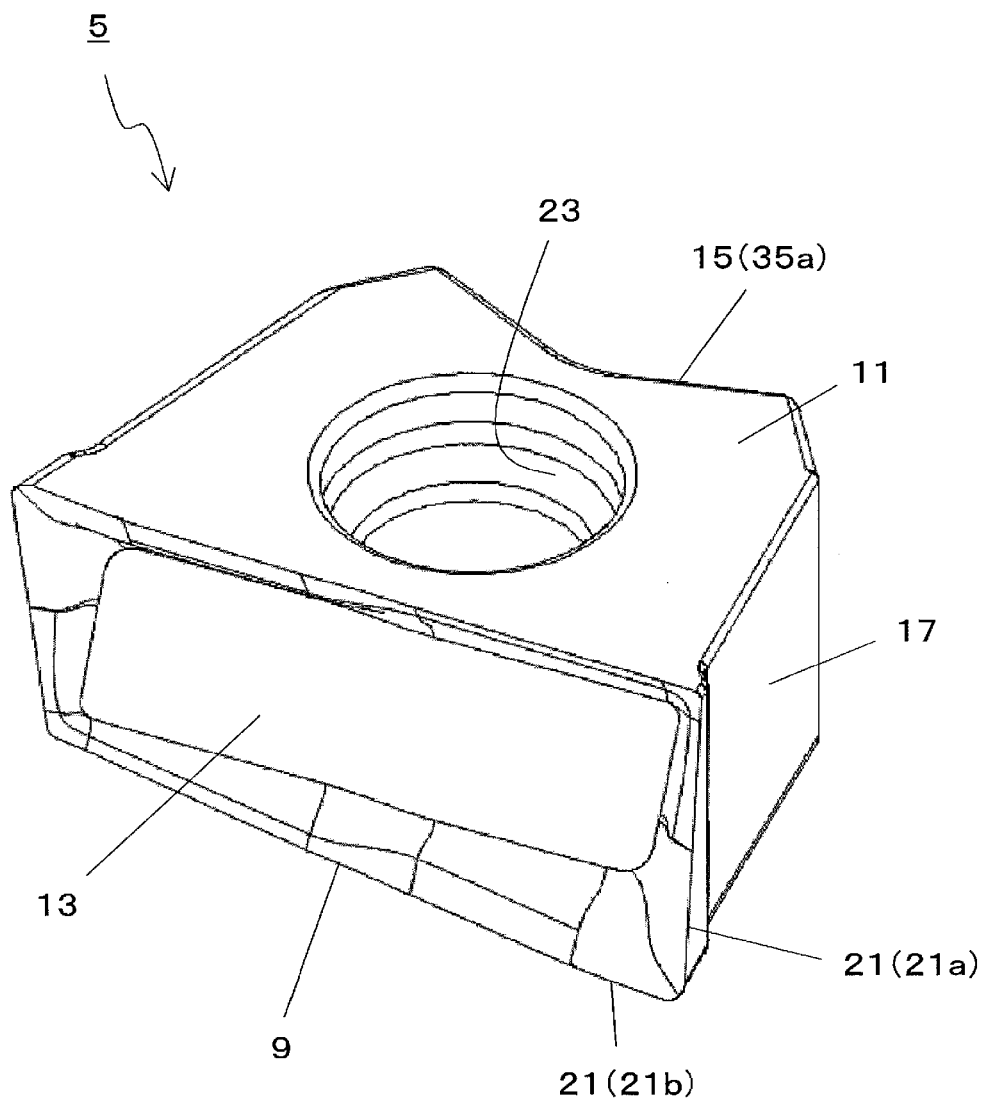
FIG. 5 is a perspective view illustrating a cutting insert in the cutting tool illustrated in FIG. 1.
Figure 6:
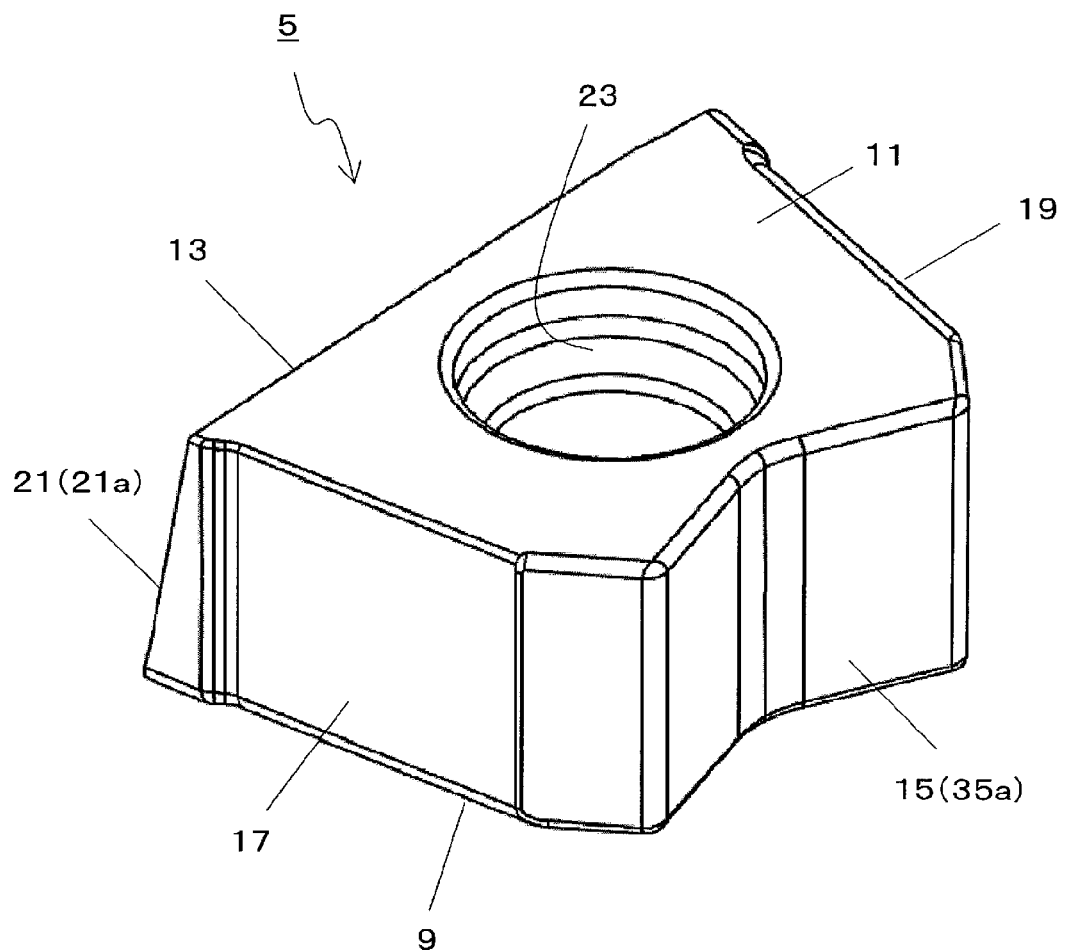
FIG. 6 is a perspective view of the cutting insert illustrated in FIG. 5 as viewed from a side of the rear side surface.
Figure 7:
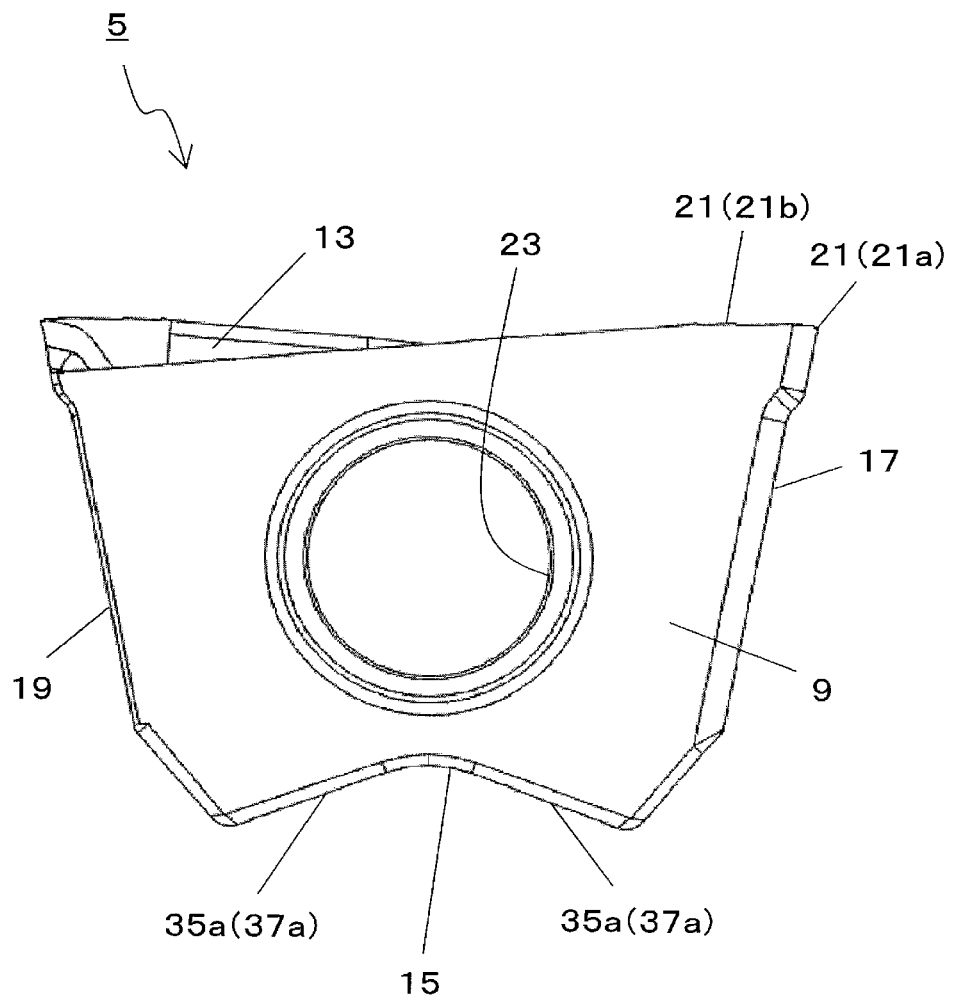
FIG. 7 is a side view of the cutting insert illustrated in FIG. 5 as viewed from a side of the front end surface.
Figure 8:
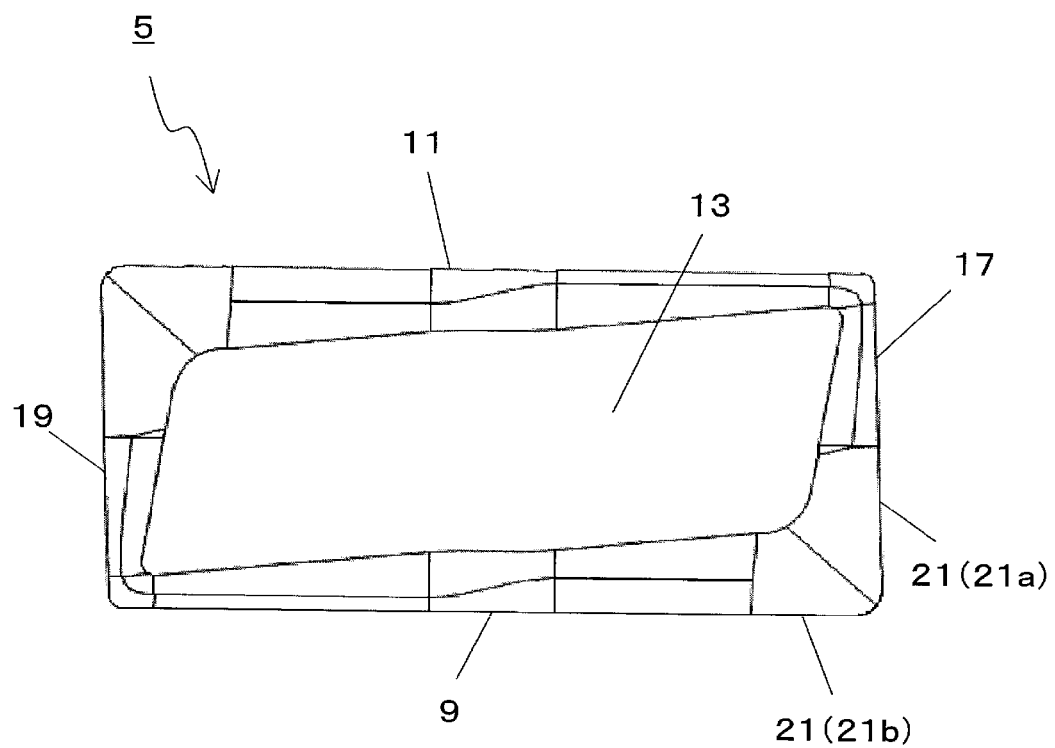
FIG. 8 is a side view of the cutting insert illustrated in FIG. 5 as viewed from a side of the front side surface.
Figure 9:
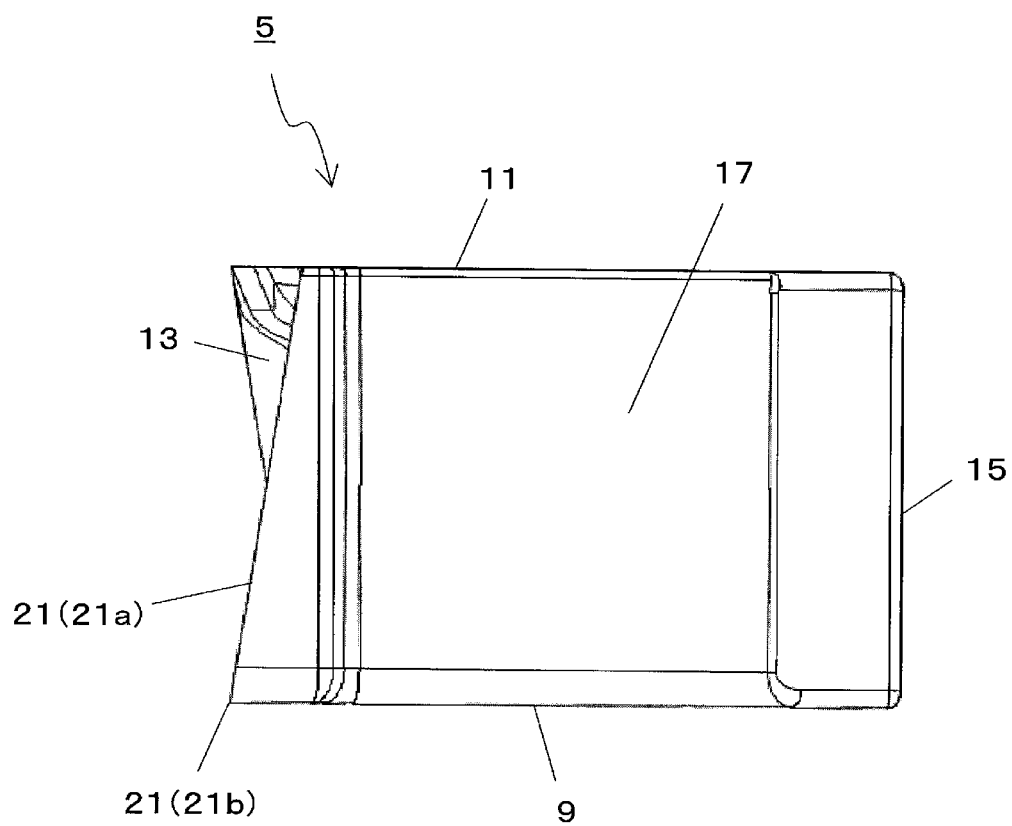
FIG. 9 is a side view of the cutting insert illustrated in FIG. 5 as viewed from a side of the outer side surface.
Figure 10:
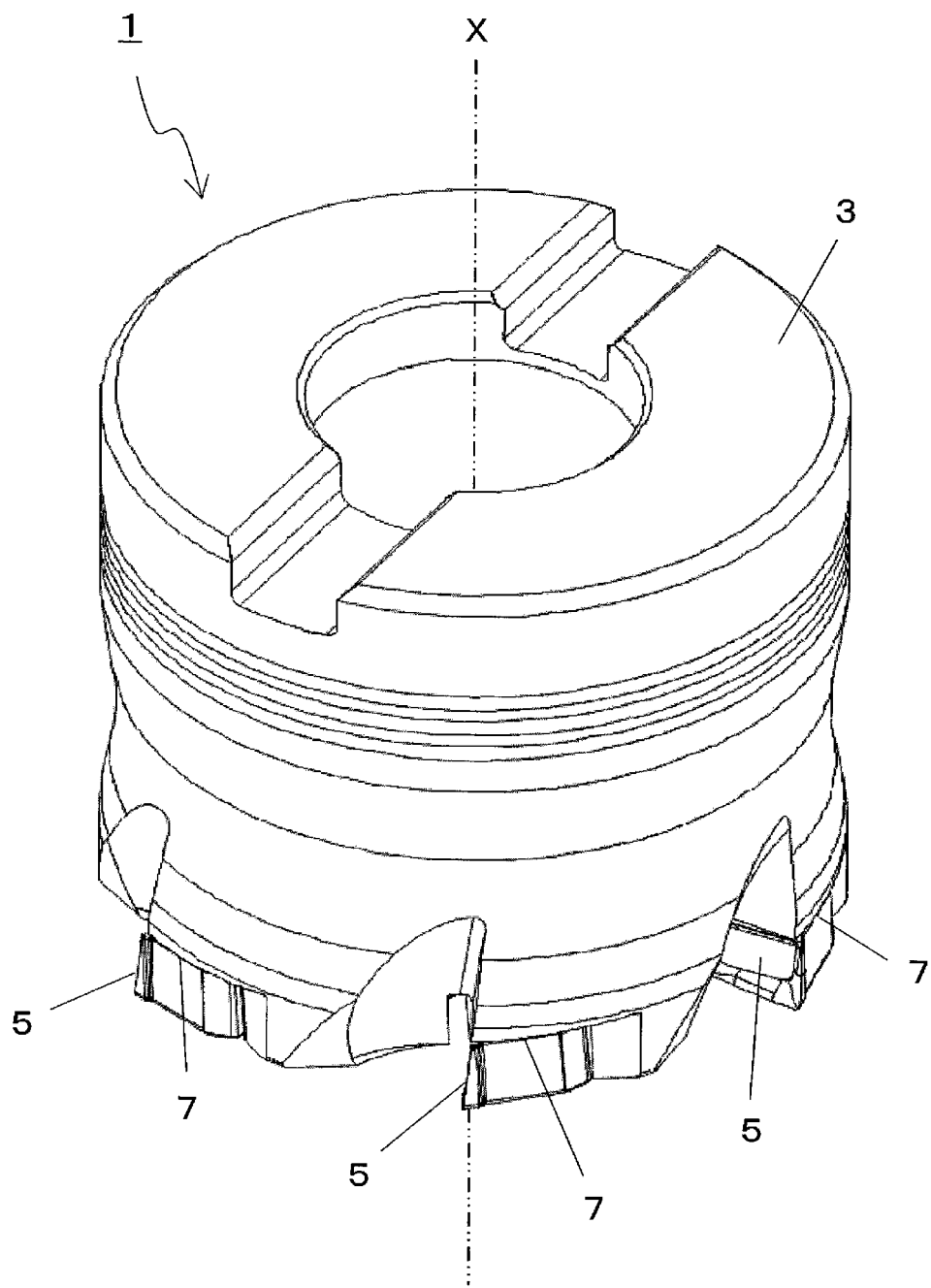
FIG. 10 is a perspective view of a cutting tool of a second embodiment of the present invention.
Figure 11:
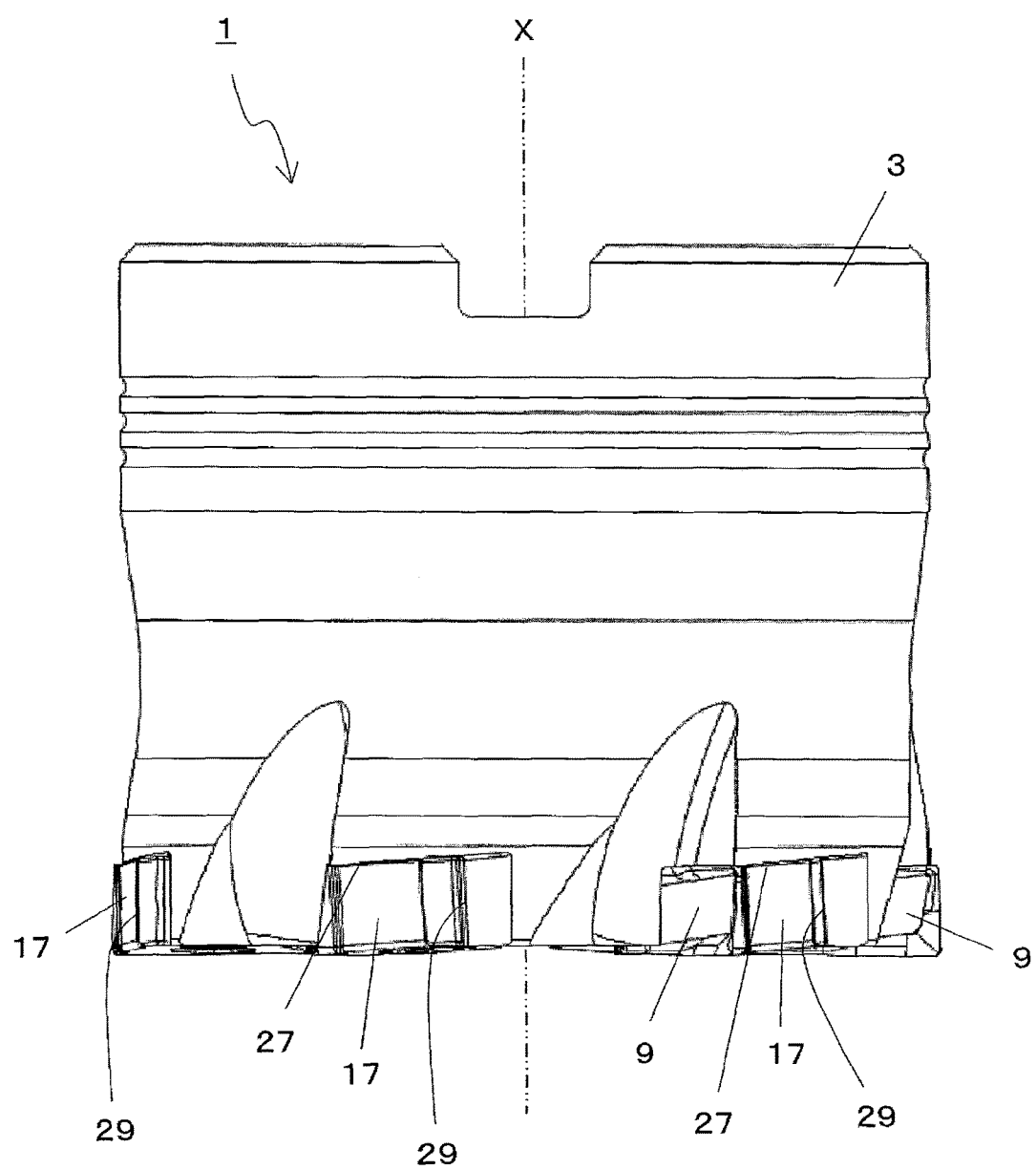
FIG. 11 is a side view of the cutting tool illustrated in FIG. 10.
Figure 12:
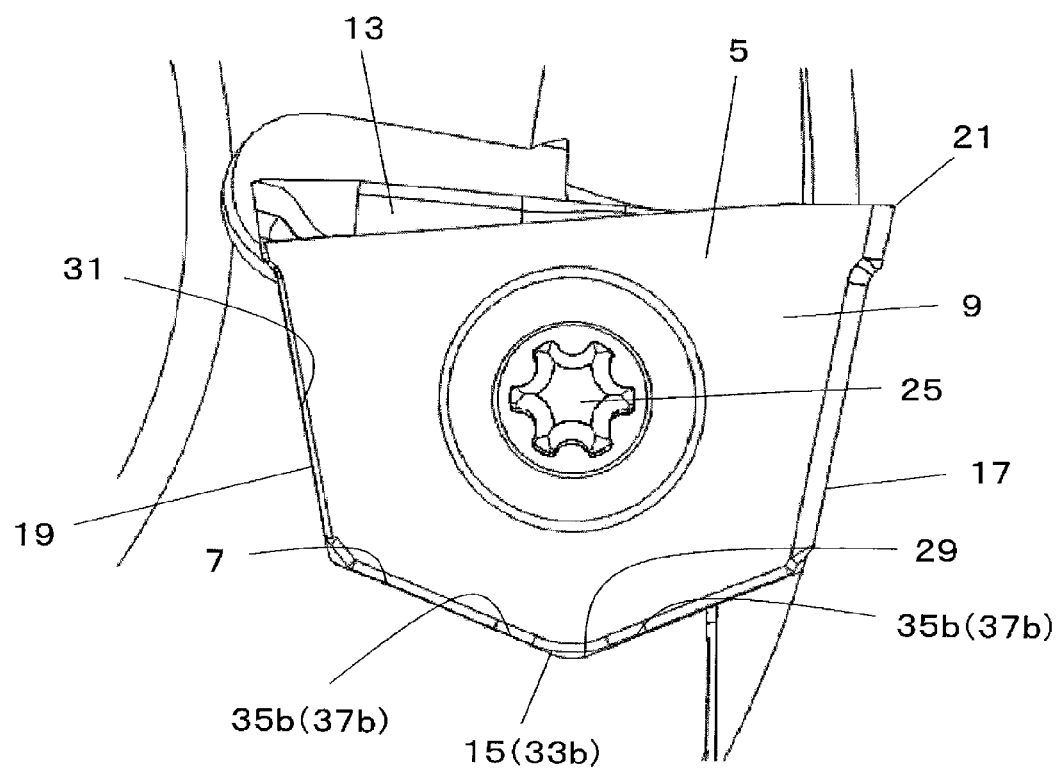
FIG. 12 is an enlarged plane view of a region corresponding to the region illustrated in FIG. 4 in the cutting tool illustrated in FIG. 10.
Figure 13:
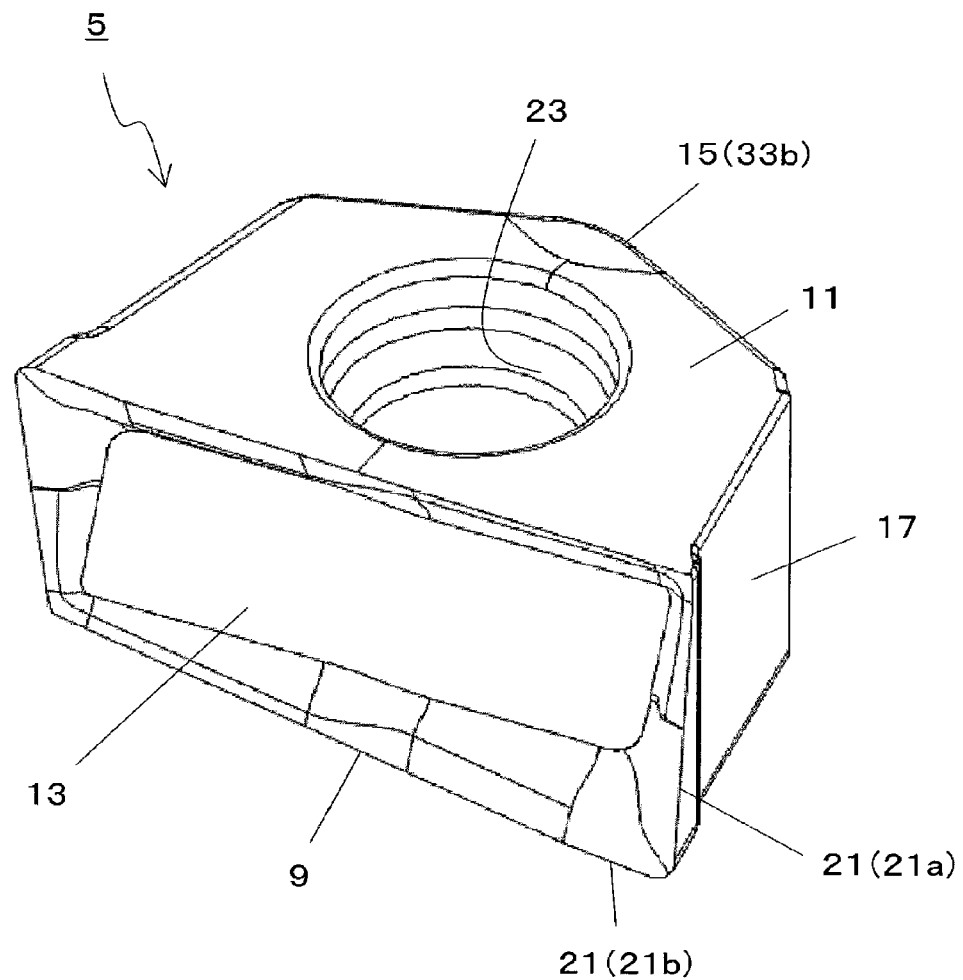
FIG. 13 is a perspective view illustrating a cutting insert in the cutting tool illustrated in FIG. 10.
Figure 14:
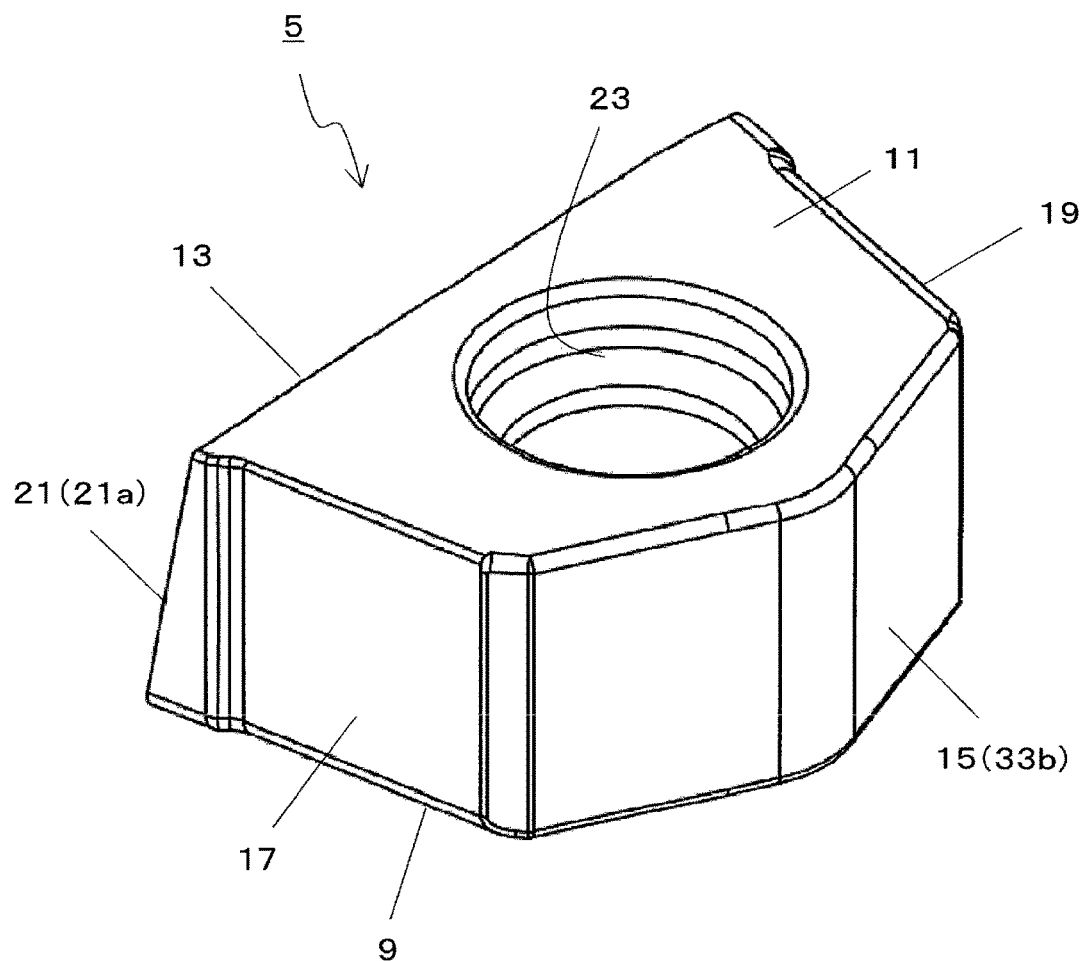
FIG. 14 is a perspective view of the cutting insert illustrated in FIG. 13 as viewed from a side of the rear side surface.
Figure 15:
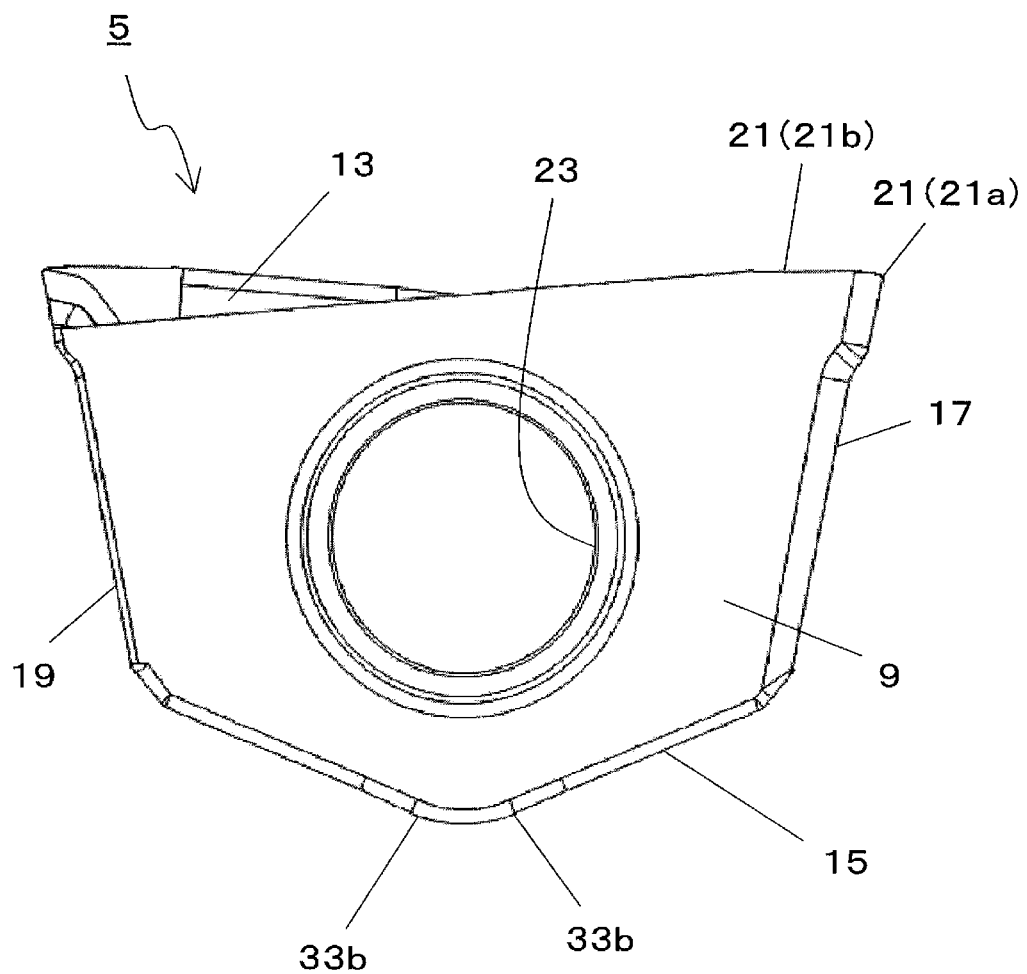
FIG. 15 is a side view of the cutting insert illustrated in FIG. 13 as viewed from a side of the front end surface.
Figure 16:
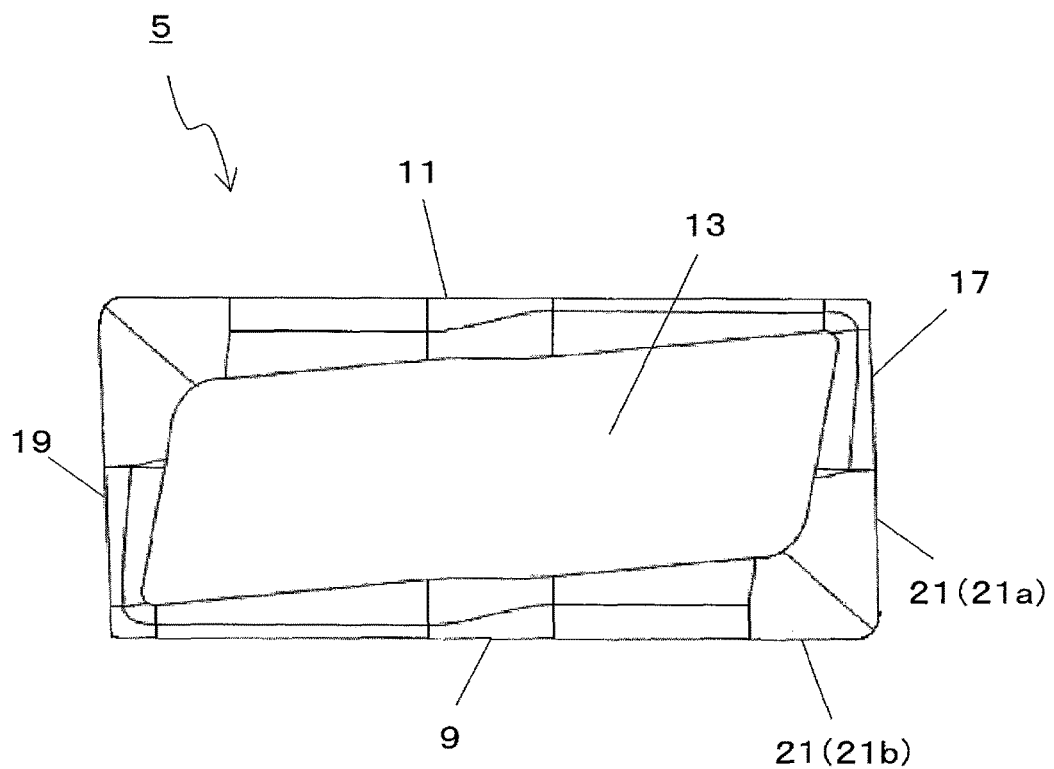
FIG. 16 is a side view of the cutting insert illustrated in FIG. 13 as viewed from a side of the front side surface.
Figure 17:
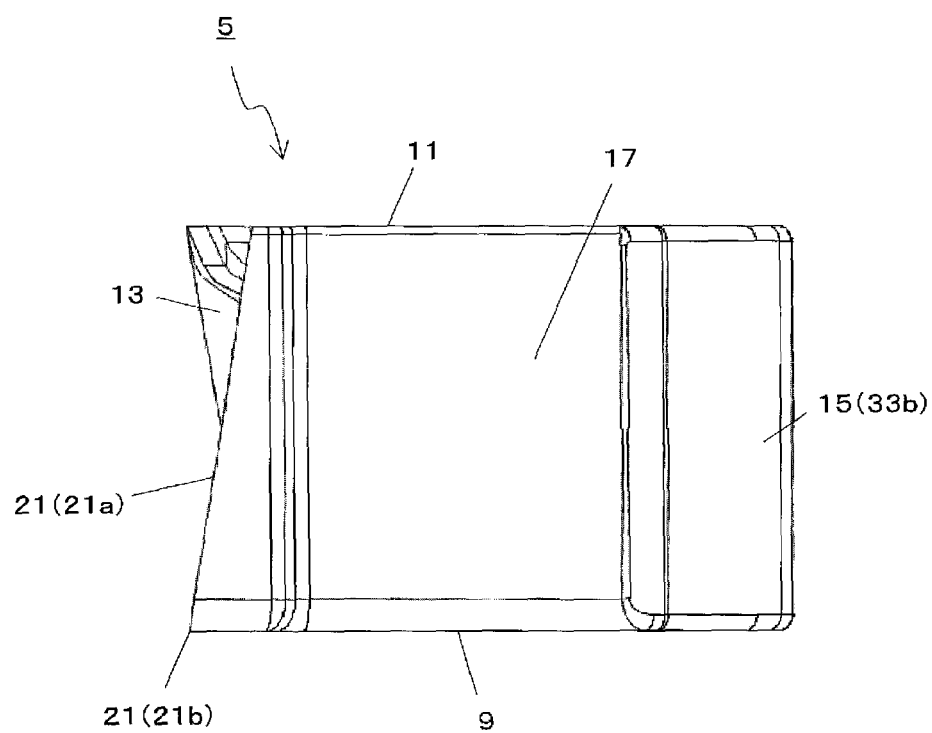
FIG. 17 is a side view of the cutting insert illustrated in FIG. 13 as viewed from a side of the outer side surface.

The front end of the holder 3 is provided with an insert pocket 7 (may also be referred to as merely as a pocket in the following). Specifically, in the holder 3 of the present embodiment, the outer peripheral surface of the front end of the holder 3 is provided with a plurality of pockets 7. Each of the pockets 7 is a portion to which an insert 5 is attached, and opens out at the outer peripheral surface and the front end surface of the holder 3. As illustrated in FIG. 3, six pockets 7 are provided at the front end of the holder 3, and these pockets 7 are provided at equal intervals in rotational symmetry. Further, the configuration can also be one in which the plurality of pockets 7 have mutually different intervals.

The inserts 5 are attached to the six pockets 7. Therefore, the six inserts 5 are attached in the cutting tool 1 of the present embodiment. In addition, the number of the pockets 7 and the inserts 5 is not limited to six. The number of pockets and inserts can be only one, or can be more than one. Further, even when a plurality of pockets 7 and inserts 5 are present, the number of these can be 2, 3, 4, or 5.

The insert 5 in the present embodiment has a substantially rectangular parallelepiped shape and includes a front end surface 9, a rear end surface 11, a front side surface 13, a rear side surface 15, an outer side surface 17, and an inner side surface 19. Each of the front side surface 13, the rear side surface 15, the outer side surface 17, and the inner side surface 19 has a substantially rectangular shape in a front view thereof. Further, the substantially rectangular shape does not mean a strictly rectangular shape. For example, although each of the front side surface 13, the rear side surface 15, the outer side surface 17, and the inner side surface 19 has four corner portions, these corner portions may have a rounded shape in a front view thereof. In addition, the edge portions located connecting neighboring corner portions need not have a strictly straight line shape, but can have a shape in which a portion thereof has unevenness.

The front end surface 9 is a surface located on the front end side of the holder 3, and is the surface that is visible in FIG. 3. The rear end surface 11 is a surface opposite to the front end surface 9, and is one of the surfaces that is in contact with the holder 3 as is described later. The front side surface 13 is a surface located toward the front in the rotational direction of the rotational axis X. The rear side surface 15 is a surface opposite to the front side surface 13, and is one of the surfaces that is in contact with the holder 3 as is described later. The outer side surface 17 is a surface located on the outer peripheral side of the holder 3, and is a surface located on the outer peripheral side among the six surfaces constituting the insert 5. Because of this, the outer side surface 17 is the most visible surface in FIG. 2. The inner side surface 19 is a surface opposite to the outer side surface 17, and is one of the surfaces that is in contact with the holder 3 as is described later.

A cutting edge 21 is disposed along a ridge line at an intersection between the front side surface 13 and the front end surface 9 and a ridge line at an intersection between the front side surface 13 and the outer side surface 17. Among the cutting edges 21, the portion disposed along the ridge line at the intersection between the front side surface 13 and the outer side surface 17 is a main cutting edge 21a that functions mainly at the time of cutting a work material. Further, among the cutting edges 21, the portion disposed along the ridge line at the intersection between the front side surface 13 and the front end surface 9 is a minor cutting edge 21b that functions subordinately to the main cutting edge 21a at the time of cutting a work material.

Since the cutting edges 21 are disposed at the above-mentioned positions, chips generated due to machining flow along the surface of the front side surface 13 of the insert 5. Because of this, the front side surface 13 functions as a so called rake face. In addition, since the cutting edges 21 are disposed at the above-mentioned positions, the front end surface 9 and the outer side surface 17 of the insert 5 function as so called flank surfaces.

Examples of the material of the insert 5 include cemented carbide, cermet, or the like. Examples of the composition of the cemented carbide alloy include WC—Co produced by adding a cobalt (Co) powder to tungsten carbide (WC) and sintering the mixture, WC—TiC—Co formed by adding titanium carbide (TiC) to WC—Co, or WC—TiC—TaC—Co formed by adding tantalum carbide (TaC) to WC—TiC—Co. Cermet is a sintered composite material obtained by combining a metal with a ceramic component and specific examples thereof include titanium compounds in which titanium carbide (TiC) or titanium nitride (TiN) is the main component.

The surface of the insert 5 may be coated with a coating film using a chemical vapor deposition (CVD) method or a physical vapor deposition (PVD) method. Examples of the composition of the coating film include titanium carbide (TiC), titanium nitride (TiN), titanium carbonitride (TiCN), alumina (Al$_2$O$_3$), and the like.

Although the size of the insert 5 is not particularly limited, for example, in the insert 5 of the present embodiment, the maximum value of the width in a direction from the front side surface 13 to the rear side surface 15 in a front end view may be set to about from 5 to 20 mm. In addition, the maximum value of the width in a direction from the inner side surface 19 to the outer side surface 17 in a front end view may be set to about from 5 to 20 mm. Further, the maximum value of the height in a direction along the rotational axis X from the front end surface 9 to the rear end surface 11 may be from 3 to 10 mm. Here, the maximum value of the height from the front end surface 9 to the rear end surface 11 implies the length in a direction along the rotational axis X between the front end of the front end surface 9 and the rear end of the rear end surface 11.

The insert 5 according to the present embodiment includes a through hole 23 penetrating through from the front end surface 9 to the rear end surface 11. The through hole 23 is provided for the insertion of a screw 25 when the insert 5 is fixed to a holder 3 by a screw. The cutting insert 5 is fixed to the holder 3 by inserting a screw 25 into the through hole 23 of the insert 5, inserting the tip of this screw 25 into a screw hole (not illustrated) provided in the insert pocket 7, and mutually engaging the threaded portions thereof.

In the present embodiment, the direction of penetration of the through hole 23 is substantially parallel to the rotational axis X. Although the configuration can also be one such that the through hole 23 can be formed from the front side surface 13 to the rear side surface 15, or alternatively, can be formed from the outer side surface 17 to the inner side surface 19, the through hole 23 is preferably formed from the front end surface 9 to the rear end surface 11 as in the present embodiment. This is because the load acting on the rear end surface 11 during machining is small compared to those acting on the rear side surface 15 and the inner side surface 19.

The pocket 7 in the present embodiment includes the three restraining surfaces of a first restraining surface 27, a second restraining surface 29, and a third restraining surface 31. The first restraining surface 27 faces toward the front end of the holder 3 similar to the front end surface 9 of the insert 5, and is contact with the rear end surface 11 of the insert 5. The second restraining surface 29 faces toward the front of the rotational direction of the rotational axis X similar to the front side surface 13 of the insert 5, and is contact with the rear side surface 15 of the insert 5. The third restraining surface 31 faces toward the outer peripheral side of the holder 3 similar to the outer side surface 17 of the insert 5, and is contact with the inner side surface 19 of the insert 5.

At this time, in a front end view, the second restraining surface 29 of the holder 3 includes a projecting portion 33a having a curved line shape, and projecting toward the front in the rotational direction. In addition, in a front end view, the rear side surface 15 of the insert 5 includes a recessed portion 35a that is in contact with the projecting portion 33a.

When the rear side surface 15 of the insert 5 and the second restraining surface 29 of the holder 3 each have a flat surface shape, it is possible to cause surface contact between the rear side surface 15 and the second restraining surface 29, and the inner side surface 19 and the third restraining surface 31. However, in such a case, the restraining of the insert 5 with respect to the holder 3 can become unstable.

For example, a centrifugal force acts on the insert 5 during machining because of the rotations of the holder 3. In particular, if the rotational speed of the holder 3 becomes extremely high, the centrifugal force acting on the insert 5 becomes extremely large. Therefore, when the rear side surface 15 and the second restraining surface 29 are flat surfaces, the restraining position of the insert 5 with respect to the holder 3 is likely to shift toward the outer peripheral side due to the above-mentioned centrifugal force.

In addition, in the case in which the projecting portion 33a and the recessed portion 35a are constituted by combining flat surfaces, the position of the insert 5 is fixed because of the projecting portion 33a and the recessed portion 35a forming surface contacts in their respective flat surface portions. Because of this, unless they have been manufactured with an extremely high accuracy, the inner side surface 19 of the insert 5 and the third restraining surface 31 of the holder 3 may not be in contact with each other. In such a case, the durability against the load acting on the insert 5 in a direction from the outer periphery to the rotational axis X during machining decreases.

However, since the cutting tool 1 of the present embodiment has a projecting portion 33a and a recessed portion 35a, in a front end view, while maintaining the state of the rear side surface 15 of the insert 5 and the second restraining surface 29 of the holder 3 in contact at two points, it becomes possible to finely adjust the position of the insert 5 so as to rotate centering on the projecting portion 33a having a convex curved shape. Because of this, the inner side surface 19 of the insert 5 and the third restraining surface 31 of the holder 3 can be made to be reliably in contact with each other. Because of this, in a front end view, the cutting insert 5 may be in contact with the holder 3 at least at three points and supported at three points.

In this manner, the insert 5 is in contact with the holder 3 at least at the three points of the two points between the rear side surface 15 of the insert 5 and the second restraining surface 29 of the holder 3 and the one point between the inner side surface 19 of the insert 5 and the third restraining surface 31 of the holder 3. Because of this, both the restraining with respect to the centrifugal force acting on the insert 5 and the durability with respect to the load acting from the outer periphery to the rotational axis X can be increased. As a result, the insert 5 can be fixed to the holder 3 in a stable manner.

Specifically, the projecting portion 33a in the second restraining surface 29 of the holder 3 extends in a direction parallel to the rotational axis X, and has a curved line shape projecting toward the front in the rotational direction in a cross-section orthogonal to the rotational axis X. Because of this, the projecting portion 33a in the second restraining surface 29 has a curved line shape projecting toward the front in the rotational direction in a front end view.

The projecting portion 33a is not particularly limited as long as the projecting portion 33a has a curved line shape projecting toward the front in the rotational direction, for example, and may also have a radiating line shape or an elliptical shape. The projecting portion 33a of the present embodiment has a convex circular arc shape. When the projecting portion 33a is in a convex circular arc shape in a front end view, the center of the virtual circle constituting this arc coincides with the rotational axis of the insert 5 at the time of fine adjustment of the position of the insert 5. Because of this, fine adjustment of the position of the insert 5 becomes easy.

On the other hand, the recessed portion 35a in the insert 5, in a front end view, has a concave shape recessed toward the front in the rotational direction. In addition, the recessed portion 35a extends in a direction parallel to the rotational axis X similar to the projecting portion 33a. Because of this, the recessed portion 35a has a curved line shape recessed toward the front in the rotational direction even in a cross-section orthogonal to the rotational axis X.

In other words, the recessed portion 35a in the present embodiment has a groove shape and extends in a direction from the front end surface 9 to the rear end surface 11 of the inserts. Therefore, in the present embodiment, the recessed portion 35a can also be referred to as the groove portion 35a.

The groove portion 35a of the rear side surface 15 in the present embodiment extends in a direction from the front end to the rear end of the holder 3, and has two flat surfaces 37a whose mutual gap gets smaller toward a groove bottom. In other words, the groove portion 35a has a pair of flat surfaces 37a, and has a shape of a V-shaped groove extending in a direction parallel to the rotational axis X. In this manner, since the groove portion 35a includes such two flat surfaces 37a, it is possible to maintain a state in which the rear sides surface 15 and the second restraining surface 29 contact at two points.

Further, instead of two flat surfaces 37a whose mutual gap gets smaller toward the groove bottom, the groove portion 35a may also have two convex surfaces whose mutual gap gets smaller toward the groove bottom in a front end view for the purpose of making the rear side surface 15 and the second restraining surface 29 contact at two points.

In addition, in a front end view of the insert 1 of the present embodiment, the virtual straight lines each extended from the two flat surfaces 37a to the groove bottom intersect at an obtuse angle. With a configuration in which the virtual straight lines intersect at an acute angle, the load can be easy to get concentrated on the groove bottom. On the other hand, with a configuration in which the virtual straight lines intersect at an obtuse angle, it is possible to avoid the above-mentioned load getting concentrated.

Further, when the recessed portion 35a as in the present embodiment is a groove portion 35a having a groove shape, the groove bottom of the groove portion 35a is preferably separated from the projecting portion 33a. If the groove bottom of the groove portion 35a is in contact with the projecting portion 33a, the load may get concentrated at this groove bottom, and cracks may occur at the groove bottom. However, because the groove bottom of the groove portion 35a is separated from the projecting portion 33a, it is possible to make small the possibility of cracks occurring at the groove bottom.

In the present embodiment, a rear end surface 11 of the insert 5 is in contact with the first restraining surface 27 of the holder 3, and the insert 5 is in contact with the holder 3 at least at the three points of the two points between the rear side surface 15 of the insert 5 and the second restraining surface 29 of the holder 3 and the one point between the inner side surface 19 of the inserts and the third restraining surface 31 of the holder 3. The contact at the above-mentioned three points is not intended to be point contacts in a strict sense.

Specifically, at the time of the insert 5 being in contact with the holder 3, by at least one of the holder 3 and the insert 5 undergoing elastic deformation, surface contact may also be made in a state with a slight width. When elastically deformed in this manner, the insert 5 may have surface contacts with the holder 3 at three points.

For example, in the cutting tool 1 of the present embodiment, the holder 3 may be constituted from a metallic member such as steel, cast iron, or aluminum alloy, and the insert 5 is constituted from cemented carbide, or cermet which is harder than the material constituting the holder 3. Because of this, the holder 3 elastically deforms when the insert 5 is made to be in contact with the holder 3. Therefore, at the rear end surface 11 and the rear side surface 15 of the insert 5, the insert 5 has surface contact at three positions with respect to the holder 3.

Next, description will be given of a cutting tool 1 according to a second embodiment with reference to the drawings.

The cutting tool 1 of the second embodiment, as illustrated in FIGS. 10 to 17, is provided with a holder 3 and an insert 5 similar to the first embodiment above. The basic structure of the cutting tool 1 of the present embodiment is the same as that of the cutting tool 1 of the first embodiment. Therefore, in the following, mainly the points of difference from the cutting tool 1 of the first embodiment are described, and descriptions of the portions having the same constitution as the cutting tool 1 of the first embodiment will be omitted.

The insert 5 in the present embodiment has a substantially rectangular parallelepiped shape and includes a front end surface 9, a rear end surface 11, a front side surface 13, a rear side surface 15, an outer side surface 17, and an inner side surface 19 similar to the insert 5 in the first embodiment. Further, the holder 3 in the present embodiment is provided at the front end side with insert pockets 7 including the three restraining surfaces of a first restraining surface 27, a second restraining surface 29, and a third restraining surface 31, similar to the holder 3 in the first embodiment.

Although the cutting tool 1 of the present embodiment includes a projecting portion 33b and a recessed portion 35b similar to the cutting tool 1 of the first embodiment, the positions at which these projecting portion 33b and the recessed portion 35b are formed and the shapes thereof are different from those of the cutting tool 1 of the first embodiment.

As described above, in the cutting tool 1 of the first embodiment, the second restraining surface 29 of the holder 3 includes the projecting portion 33a having a curved line shape, and projecting toward the front in the rotational direction. In addition, in a front end view, the rear side surface 15 of the insert 5 includes the recessed portion 35a that is in contact with the projecting portion 33a. On the other hand, in the cutting tool 1 of the present embodiment, the rear side surface 15 of the insert 5 has a projecting portion 33b having a curved line shape and projecting toward the rear in the rotational direction in a front end view. In addition, in a front end view, the second restraining surface 29 includes a recessed portion 35b that is in contact with the projecting portion 33b.

In the cutting tool 1 of the present embodiment, similar to the cutting tool 1 of the first embodiment, in a front end view, while maintaining the state of the rear side surface 15 of the insert 5 and the second restraining surface 29 of the holder 3 in contact at two points, the position of the insert 5 may be finely adjusted so as to rotate centering on the projecting portion 33b having a convex curved shape. Because of this, the inner side surface 19 of the insert 5 and the third restraining surface 31 of the holder 3 can be made to be reliably in contact with each other. Because of this, in a front end view, the cutting insert 5 can be made to be in contact with the holder 3 at least at three points and supported at three points.

The projecting portion 33b of the rear side surface 15 in the present embodiment preferably has a convex circular arc shape in a front end view similar to the projection portion 33a of the second restraining surface 29 in the first embodiment. This configuration facilitates fine adjustment of the position of the insert 5.

In addition, the recessed portion 35b of the second restraining surface 29 in the present embodiment, similar to the recessed portion 35a of the first embodiment, has a groove shape and extends in a direction parallel to the rotational axis X. Therefore, in the present embodiment, the recessed portion 35b can also be referred to as the groove portion 35b.

The groove portion 35b similar to the groove portion 35a of the rear side surface 15 in the first embodiment, extends in a direction from the front end to the rear end of the holder 3, and has two flat surfaces 37b whose mutual gap gets smaller toward a groove bottom. Since the groove portion 35b includes such two flat surfaces 37b, it is possible to maintain a state in which the rear sides surface 15 and the second restraining surface 29 more reliably contact at two points. At this time, similar to the first embodiment, in a front end view, the virtual straight lines each extended from the two flat surfaces 37b to the groove bottom intersect at an obtuse angle.

Further, instead of two flat surfaces 37b whose mutual gap gets smaller toward the groove bottom, the groove portion 35 may also have two convex curved surfaces whose mutual gap gets smaller toward the groove bottom given that the rear side surface 15 and the second restraining surface 29 contact at two points.

Next, description will be given of a cutting tool 1 of a third embodiment with reference to the drawings.

Figure 18:
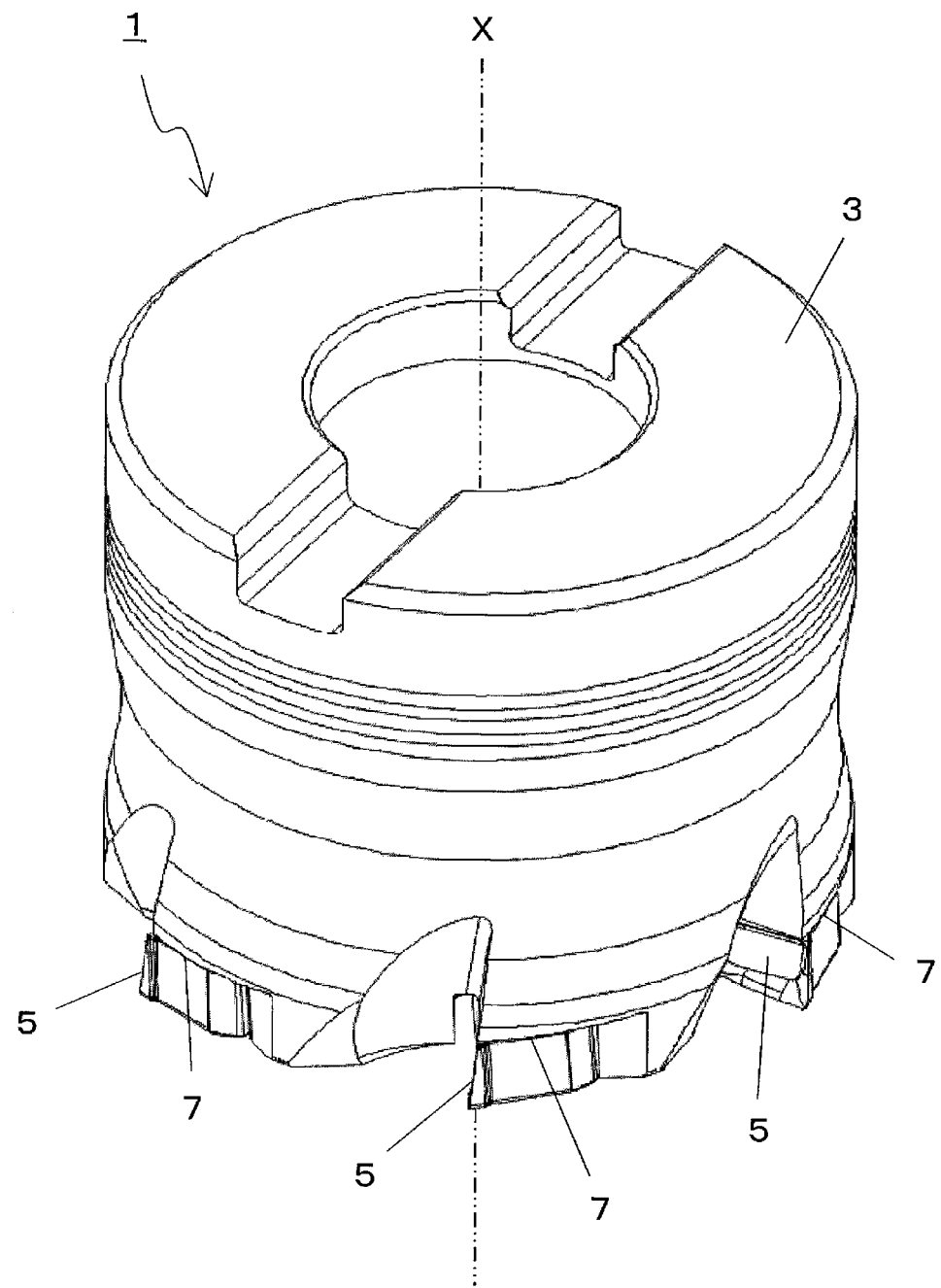
FIG. 18 is a perspective view of a cutting tool of a third embodiment of the present invention.
Figure 19:
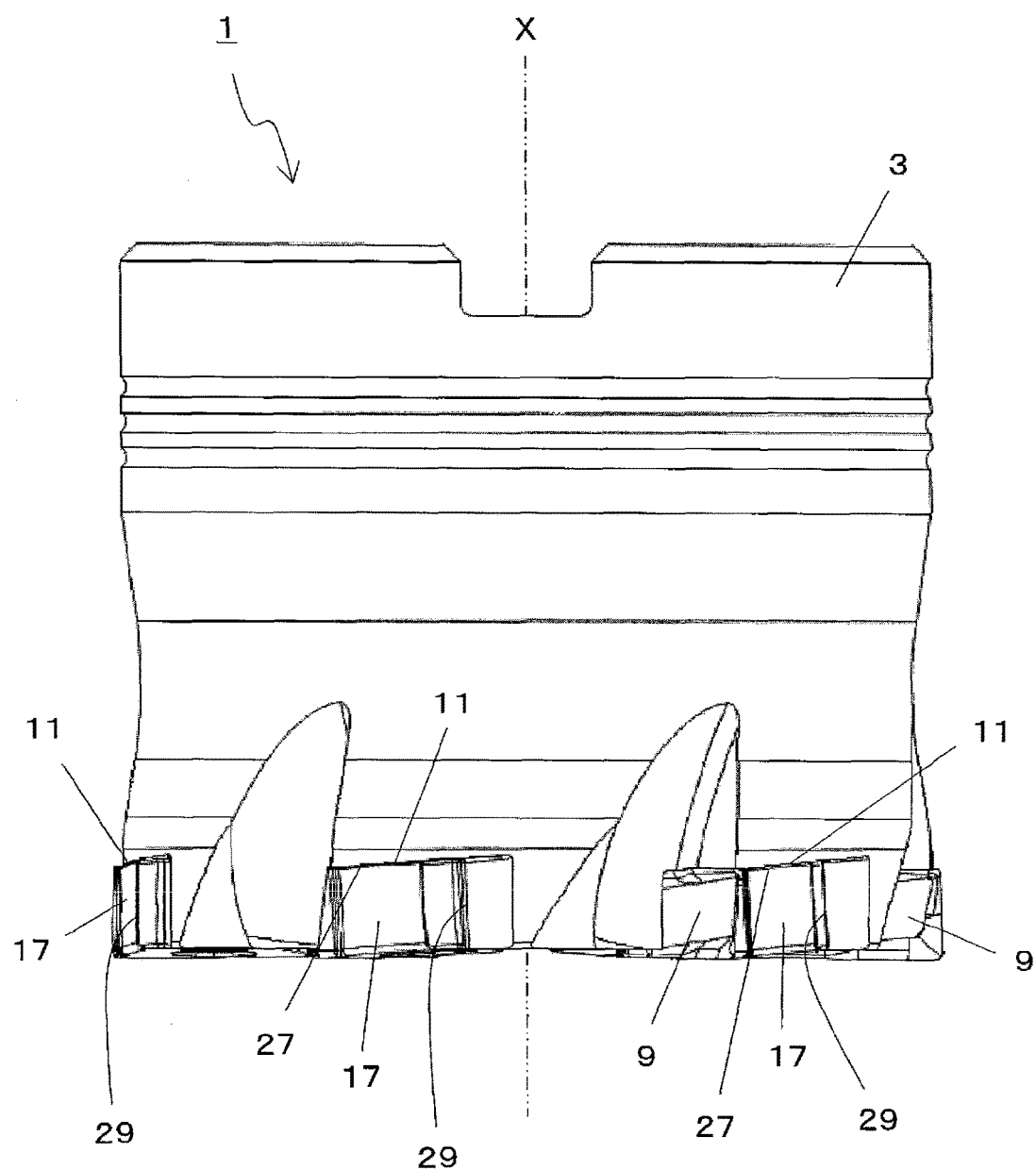
FIG. 19 is a side view of the cutting tool illustrated in FIG. 18.
Figure 20:
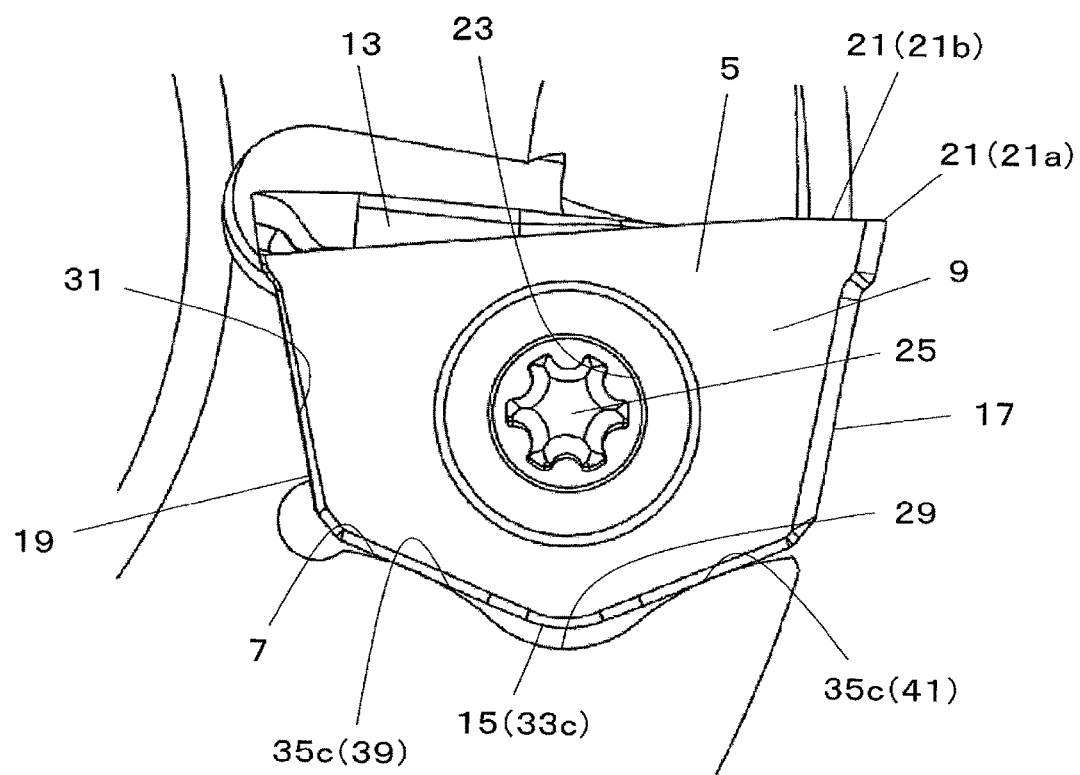
FIG. 20 is an enlarged plane view of a region corresponding to the region illustrated in FIG. 4 of the cutting tool illustrated in FIG. 18.

The cutting tool 1 of the third embodiment, as illustrated in FIGS. 18 to 20, is provided with a holder 3 and an insert 5 similar to the cutting tool 1 of the second embodiment. The basic structure of the cutting tool 1 of the present embodiment is the same as that of the cutting tool 1 of the second embodiment. Therefore, in the following, mainly the points of difference from the cutting tool 1 of the second embodiment are described, and descriptions of the portions having the same constitution as the cutting tool 1 of the second embodiment will be omitted.

The insert 5 in the present embodiment has a substantially rectangular parallelepiped shape and includes a front end surface 9, a rear end surface 11, a front side surface 13, a rear side surface 15, an outer side surface 17, and an inner side surface 19 similar to the insert 5 in the second embodiment. Further, the holder 3 in the present embodiment is provided at the front end with insert pockets 7 including the three restraining surfaces of a first restraining surface 27, a second restraining surface 29, and a third restraining surface 31, similar to the holder 3 in the second embodiment.

Although the cutting tool 1 of the present embodiment has a projecting portion 33c and a recessed portion 35c similar to the cutting tool 1 of the second embodiment, the shapes of these projecting portion 33c and the recessed portions 35c are different from those of the cutting tool 1 of the second embodiment.

In the cutting tool 1 of the second embodiment, as has been described above, the rear side surface 15 of the insert 5 has the projecting portion 33b having a curved line shape and projecting toward the rear in the rotational direction in a front end view. Further, the second restraining surface 29, in a front end view, has the recessed portion 35b recessed toward the rear in the rotational direction, and the projecting portion 33b having a convex curved line shape that is in contact with the recessed portion 35b. Further, the recessed portion 35b has a groove shape, and includes two flat surfaces 37b whose mutual gap gets smaller toward a groove bottom.

On the other hand, in the cutting tool 1 of the present embodiment, similar to the second embodiment, the second restraining surface 29 includes a groove portion 35c as a recessed portion 35c recessed toward the rear in the rotational direction in a front end view. In the present embodiment, the second restraining surface 29 includes a first convex portion 39 and a second convex portion 41 located inside the groove portion 35c in a front end view. These first convex portion 39 and second convex portion 41 each have a convex curved line shape in a front end view. In addition, the rear side surface 15 of the insert 5 has a projecting portion 33c projecting toward the rear in the rotational direction in a front end view.

Further, the projecting portion 33c having a convex curved line shape is in contact with the first convex portion 39 and second convex portion 41. At this time, the projecting portion 33c is in contact with the first convex portion 39 and the second convex portion 41 so that the vertex portion of the projecting portion 33c is positioned between the first convex portion 39 and the second convex portion 41.

Even the cutting tool 1 of the present embodiment, similar to the cutting tool 1 of the second embodiment, in a front end view, while maintaining the state of the rear side surface 15 of the insert 5 and the second restraining surface 29 of the holder 3 in contact at two points, the position of the insert 5 may be finely adjusted so as to rotate centering on the projecting portion 33c having a convex curved shape. Because of this, the inner side surface 19 of the insert 5 and the third restraining surface 31 of the holder 3 can be made to be reliably in contact with each other. Because of this, in a front end view, the cutting insert 5 may be in contact with the holder 3 at least at three points and supported at three points.

The projecting portion 33c of the rear side surface 15 in the present embodiment may have a curved line shape projecting toward the rear in the rotational direction as the projecting portion 33b in the second embodiment, or else, may be constituted from two flat surfaces whose mutual gap gets smaller toward the vertex portion. Since the first convex portion 39 and the second convex portion 41 have a convex curved line shape in a front end view, even when the shape of the projecting portion 33c is any one of the above, it is possible to make the rear side surface 15 of the insert 5 and the second restraining surface 29 of the holder 3 contact at two points.

The first convex portion 39 and the second convex portion 41 having convex curved line shape in a front end view preferably have a convex circular arc shape in a front end view. This configuration facilitates fine adjustment of the position of the insert 5.

In addition, the cutting tool 1 of the second embodiment and the cutting tool 1 of the third embodiment, similar to the cutting tool 1 of the first embodiment, preferably have the recessed portions 35b, 35c that are the groove portions 35b, 35c having a groove shape, and the groove bottoms of the groove portions 35b, 35c are preferably separated from the projecting portions 33b, 33c. This is because the generation of cracks in the groove portions 35b, 35c can be decreased.

In the above, although the cutting tools 1 of some embodiments of the present invention are described in detail with reference to the drawings, the cutting tools of the present invention are not limited to the constitutions of the above-mentioned embodiments.

Method for Manufacturing Machined Product

Next, description will be given of a method for manufacturing a machined product of one embodiment of the present invention with reference to the drawings.

The machined product is manufactured by machining a work material 101. The method for manufacturing a machined product in the present embodiment includes the following steps. Specifically, the steps of:

(1) rotating a cutting tool 1 exemplified by the above-mentioned embodiments;

(2) bringing the cutting edge 21 of the cutting tool 1 that is rotating into contact with the work material 101, and (3) separating the cutting tool 1 from the work material 101.

Figure 21:
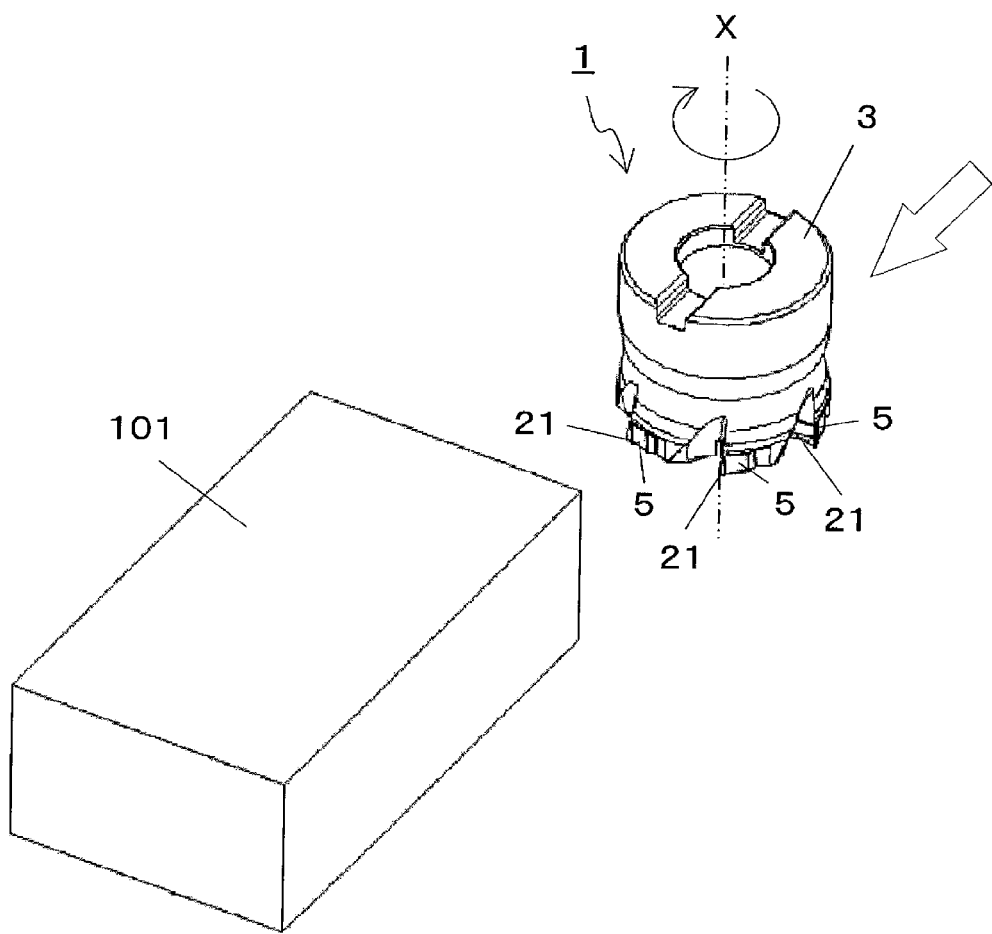
FIG. 21 is a schematic view illustrating one step of a method for manufacturing a machined product of one embodiment of the present invention.
Figure 22:
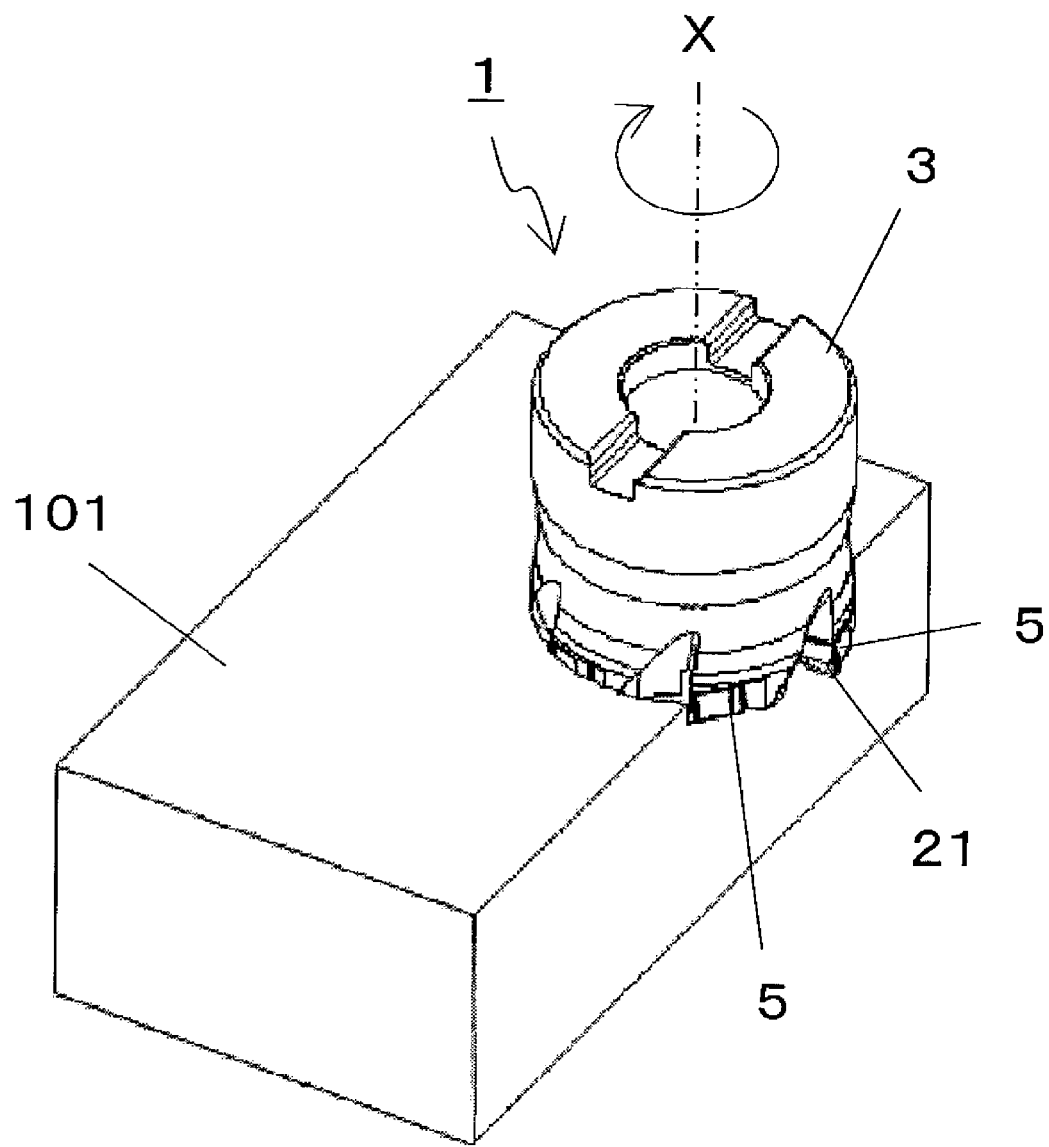
FIG. 22 is a schematic view illustrating one step of the method for manufacturing a machined product of one embodiment of the present invention.
Figure 23:
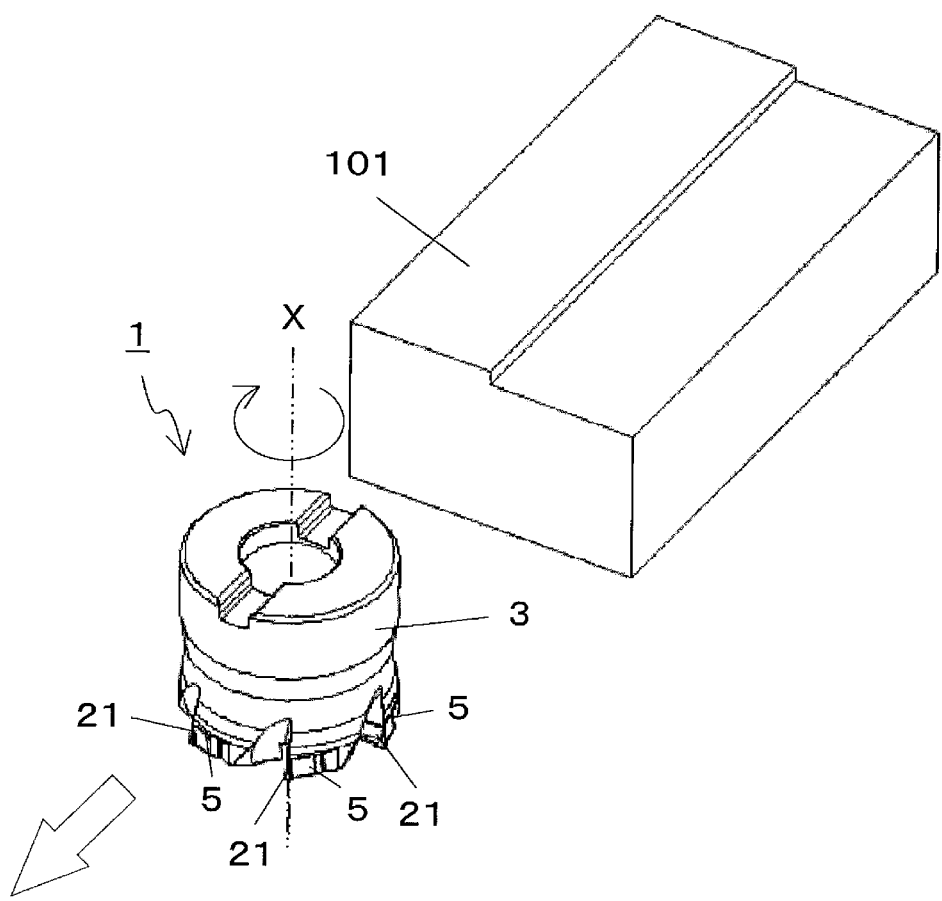
FIG. 23 is a schematic view illustrating one step of the method for manufacturing a machined product of one embodiment of the present invention.

More specifically, firstly, as illustrated in FIG. 21, while the cutting tool 1 is made to rotate about an axis, the cutting tool 1 is brought relatively close the work material 101. Next, the cutting edge 21 of the cutting tool 1 is brought into contact with the work material 101, and the work material 101 is cut. As illustrated in FIG. 22, in the present embodiment, as the cutting edge 21, the main cutting edge and the minor cutting edge are being made to come into contact with the work material 101. Next, as illustrated in FIG. 23, the cutting tool 1 is moved away relative to the work material 101.

In the present embodiment, the work material 101 is fixed and also the cutting tool 1 that is fixed in the periphery of a shaft Y and is in a rotating state is brought close to the work material 101. Further, in FIG. 22, the work material 101 is cut by making the first cutting edge 219a of the insert 5 that is rotating come into contact with the work material 101. Further, in FIG. 23, the cutting tool 1 in the rotated state is being moved away from the work material 101.

Further, in the machining of the manufacturing method of the present embodiment, in each of the respective steps, although the cutting tool 1 is brought into contact with or separated from the work material 101 by moving the cutting tool 1, the present embodiment is of course not limited to such a mode.

For example, in step (1), the work material 101 may be brought close to the cutting tool 1. In the same manner, in step (3), the work material 101 may be moved away from the cutting tool 1. When the machining is to be continued, steps of bringing the cutting edge 21 of the cutting insert 5 into contact with different positions on the work material 101 may be repeated while maintaining the rotating state of the cutting tool 101.

Here, representative examples of the material of the work material 101 include carbon steel, alloy steel, stainless steel, cast iron, non-ferrous metals, or the like.

REFERENCE SIGNS LIST

1 Cutting tool
3 Holder
5 Cutting insert (Insert)
7 Insert pocket (Pocket)
9 Front end surface
11 Rear end surface
13 Front side surface
15 Rear side surface
17 Outer side surface
19 Inner side surface
21 Cutting edge
21a Main cutting edge
21b Miner cutting edge
23 Through hole
25 Screw
27 First restraining surface
29 Second restraining surface
31 Third restraining surface
33a, 33b, 33c Projecting portions
35a, 35b, 35c Recessed portion (groove portion)
37a, 37b Flat surface
39 First convex portion
41 Second convex portion
101 Work material

The invention claimed is:

1. A cutting tool comprising:
a holder extended in a direction from a front end to a rear end along a rotational axis, the holder comprising an insert pocket at the front end, the insert pocket comprising:
a first restraining surface; and
a second restraining surface connected to the first restraining surface at an intersection; and
a cutting insert attached to the insert pocket, the cutting insert comprising:
a front end surface located on a front end side of the holder;
a rear end surface opposite to the front end surface;
a front side surface located toward the front in a rotational direction of the rotational axis;
a rear side surface opposite to the front side surface;
an outer side surface located on an outer peripheral side of the holder;
an inner side surface opposite to the outer side surface, in connection with the rear side surface at the intersection, and being in contact with the second restraining surface; and
a cutting edge disposed along a ridge line at an intersection between the front side surface and the front end surface and a ridge line at an intersection between the front side surface and the outer side surface,
wherein
the cutting insert and the holder comprise:
a first gap at the intersection in a front end view; and
a second gap between the intersection and the outer side surface in the front end view,
the first restraining surface comprises a projecting portion having a curved line shape, and projecting toward the front in the rotational direction in the front end view, and
the rear side surface comprises a recessed portion that is in contact with the projecting portion only at a first point and a second point, wherein
the first point is disposed between the first gap and the second gap, and
the second point is disposed between the second gap and the outer side surface.

2. The cutting tool according to claim 1, wherein
the recessed portion has a groove shape and extends in a direction from the front end surface to the rear end surface,
the recessed portion comprising a first flat surface, a second flat surface located to have a third gap to the first flat surface, and a bottom portion between the first flat surface and the second flat surface, and
the third gap gets smaller toward the bottom portion.

3. The cutting tool according to claim 2, wherein virtual straight lines extended from the first flat surface and the second flat surface toward the bottom portion intersect at an obtuse angle in the front end view.

4. The cutting tool according to claim 2, wherein the bottom portion of the recessed portion is separated from the projecting portion.

5. A cutting tool comprising:
a holder extended in a direction from a front end to a rear end along a rotational axis, the holder comprising an insert pocket at the front end, the insert pocket comprising:
   a first restraining surface; and
   a second restraining surface connected to the first restraining surface at an intersection; and
a cutting insert attached to the insert pocket and comprising:
   a front end surface located on a front end side of the holder;
a rear end surface opposite to the front end surface;
   a front side surface located toward the front in a rotational direction of the rotational axis;
   a rear side surface opposite to the front side surface;
   an outer side surface located on an outer peripheral side of the holder;
   an inner side surface opposite to the outer side surface, in connection with the rear side surface at the intersection, and being in contact with the second restraining surface; and
   a cutting edge disposed along a ridge line at an intersection between the front side surface and the front end surface and a ridge line at an intersection between the front side surface and the outer side surface,
wherein
   the cutting insert and the holder comprise:
      a first gap at the intersection in a front end view; and
      a second gap between the intersection and the outer side surface in the front end view,
   the rear side surface comprises a projecting portion having a curved line shape, and projecting toward the rear in a rotational direction in the front end view, and
the first restraining surface comprises a recessed portion that is in contact with the projecting portion only at a first point and a second point, wherein
the first point is disposed between the first gap and the second gap, and
the second point is disposed between the second gap and the outer side surface.

6. The cutting tool according to claim 5, wherein the first restraining surface comprises:
   a first convex portion comprising the first point; and
   a second convex portion comprising the second point, each of the first convex portion and the second convex portion having a convex curved line shape.

7. The cutting tool according to claim 5, wherein
the recessed portion has a groove shape and extends in a direction from a front end to a rear end of the holder, the recessed portion comprising a bottom portion, and
the bottom portion of the recessed portion is separated from the projecting portion.

8. The cutting tool according to claim 1, wherein the cutting insert further comprises:
   a through hole penetrating from the front end surface to the rear end surface;
and
   a screw member inserted in the through hole and fixing the cutting insert to the holder.

9. A method for manufacturing a machined product comprising:
   rotating the cutting tool according to claim 1 about the rotational axis;
   bringing the cutting edge of the cutting tool that is rotating into contact with a work material; and
   separating the cutting tool from the work material.

* * * * *